(12) United States Patent
Orr

(10) Patent No.: US 7,068,704 B1
(45) Date of Patent: Jun. 27, 2006

(54) EMBEDDED CHIRP SIGNAL FOR POSITION DETERMINATION IN CELLULAR COMMUNICATION SYSTEMS

(75) Inventor: Richard S. Orr, Montgomery Village, MD (US)

(73) Assignee: ITT Manufacturing Enterpprises, Inc., Wilmington, DE (US)

( * ) Notice: Subject to any disclaimer, the term of this patent is extended or adjusted under 35 U.S.C. 154(b) by 819 days.

(21) Appl. No.: 09/994,015

(22) Filed: Nov. 27, 2001

Related U.S. Application Data

(60) Provisional application No. 60/325,025, filed on Sep. 26, 2001.

(51) Int. Cl.
 *H04B 1/69* (2006.01)
 *H04M 11/04* (2006.01)

(52) U.S. Cl. .................... 375/139; 375/343; 455/404.2

(58) Field of Classification Search ................ 375/130, 375/139, 142, 146, 147, 150, 343; 455/404.2
 See application file for complete search history.

(56) References Cited

U.S. PATENT DOCUMENTS

| | | | | |
|---|---|---|---|---|
| 4,665,404 A | * | 5/1987 | Christy et al. ............... | 342/463 |
| 4,972,431 A | * | 11/1990 | Keegan ....................... | 375/150 |
| 4,979,170 A | * | 12/1990 | Gilhousen et al. .......... | 370/321 |
| 5,126,748 A | * | 6/1992 | Ames et al. .................. | 342/353 |
| 5,280,472 A | * | 1/1994 | Gilhousen et al. .......... | 370/335 |
| 5,293,645 A | | 3/1994 | Sood | |
| 5,398,034 A | | 3/1995 | Spilker et al. | |
| 5,604,765 A | | 2/1997 | Bruno et al. | |
| 5,701,328 A | | 12/1997 | Schuchman et al. | |
| 5,838,672 A | | 11/1998 | Ranta | |
| 5,945,949 A | | 8/1999 | Yun | |
| 6,021,330 A | | 2/2000 | Vannucci | |
| 6,058,105 A | * | 5/2000 | Hochwald et al. .......... | 370/310 |
| 6,108,553 A | | 8/2000 | Silventoinen | |
| 6,111,538 A | | 8/2000 | Schuchman et al. | |

(Continued)

FOREIGN PATENT DOCUMENTS

EP 0917385 5/1999

(Continued)

OTHER PUBLICATIONS

Skolnik, Merrill, Introduction to Radar Systems, McGraw-Hill Book Company 1980, pp. 404-407.

(Continued)

*Primary Examiner*—Jay K. Patel
*Assistant Examiner*—David B. Lugo
(74) *Attorney, Agent, or Firm*—Edell, Shapiro & Finnan, LLC

(57) ABSTRACT

Systems and methods are described here for locating the position of a mobile terminal in a cellular communications system. A base station in the cellular communication system broadcasts a communication signal having embedded therein a navigation signal. The navigation signal uses a chirp technique in which the chirp signal includes two portions, an up-chirp portion and a down-chirp portion. Each portion of the chirp signal is synchronized with a frame in the communication signal. The chirp navigation signal is at a power level much lower than the communication signal so as not to interfere with the communication signal. A mobile terminal generates a corresponding chirp signal to correlate with the incoming signal and to extract the navigation signal. The mobile terminal uses the detected navigation signal to determine a time of arrival of the communication signal for use in determining the position of the mobile terminal either at the terminal or to send to a network center for location processing.

15 Claims, 20 Drawing Sheets

U.S. PATENT DOCUMENTS

| | | |
|---|---|---|
| 6,128,501 A | 10/2000 | Ffoulkes-Jones |
| 6,163,696 A | 12/2000 | Bi et al. |
| 6,233,451 B1 * | 5/2001 | Noerpel et al. ............. 455/427 |
| 6,243,588 B1 | 6/2001 | Koorapaty et al. |
| 6,269,247 B1 | 7/2001 | Chiodini |
| 6,272,430 B1 * | 8/2001 | Krasner ..................... 701/207 |
| 6,275,190 B1 | 8/2001 | Sugiura et al. |
| 6,289,211 B1 | 9/2001 | Koorapaty et al. |
| 6,295,455 B1 | 9/2001 | Fischer et al. |
| 6,801,543 B1 * | 10/2004 | Ployer ........................ 370/468 |

FOREIGN PATENT DOCUMENTS

| | | |
|---|---|---|
| EP | 0933961 | 8/1999 |
| WO | WO 99/48233 A1 | 9/1999 |
| WO | WO 01/10154 A1 | 2/2001 |
| WO | WO 02/068985 A2 | 9/2002 |
| WO | 1 292 043 A1 | 3/2003 |

OTHER PUBLICATIONS

Dixon, Robert C., Spread Spectrum Systems with Commercial Applications, A Wiley-Interscience Publication 1994, pp. 48-50.

Batista, Elisa, No Last-Minute Rush for E911 http://www.wired.com/news/print/0,1294,47220,00.html, p. 1-3, Oct. 2, 2001.

Wired News Report, FCC Grants Waivers on E911, http://www.wired.com/news/print/0,1294,47356,00.html, p. 1-2, Oct. 5, 2001.

Fact Sheet, *FCC Wireless 911 Requirements*, WTB/Policy, p. 1-4, Jan. 2001.

Drane, et al.; "Positioning GSM Telephones"; IEEE Communications Magazine; Apr. 1998; pp. 46-54, 59.

* cited by examiner

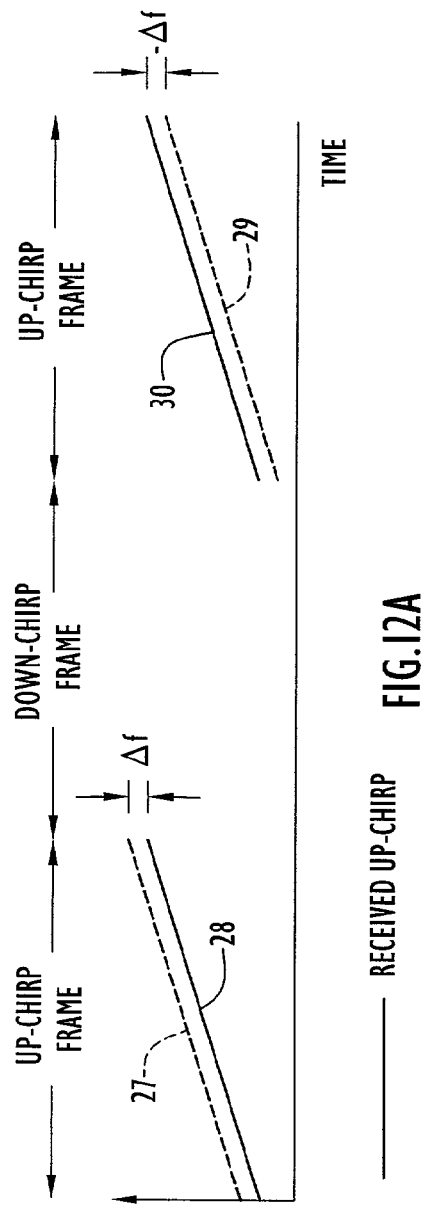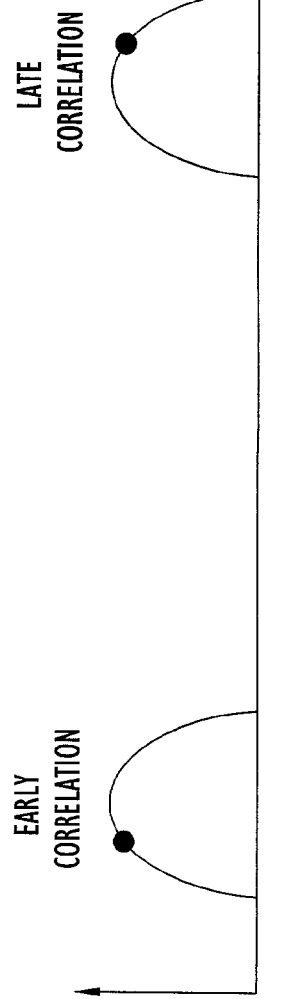

US 7,068,704 B1

EMBEDDED CHIRP SIGNAL FOR POSITION DETERMINATION IN CELLULAR COMMUNICATION SYSTEMS

CROSS REFERENCE TO RELATED APPLICATION

This application claims precedence from U.S. Provisional Patent Application Ser. No. 60/325,025 entitled "An Embedded Chirp Signal for Position Determination in Cellular Communication Systems," filed Sep. 26, 2001. The disclosure of that provisional patent application is incorporated by reference here in its entirety.

BACKGROUND OF THE INVENTION

1. Field of the Invention

This invention relates to position determination of mobile users in a wireless communication system. More particularly, it relates to cellular communication systems in which position determination is provided as a low-complexity, augmentation service to an installed base of communication equipment.

2. Description of the Related Art

Mobile communication services have grown from infancy in the 1970s to become world wide in scope, having subscribers in numbers threatening to overcome the size of the fixed telephone base. First generation (1G) analog systems concentrated entirely on voice communications. Following an explosive growth of digital technologies and the rise of the Internet, there emerged a demand for mobile data services that has been met initially by second generation (2G) digital systems. More expansive, multi-channel, multi-media services are anticipated in third generation (3G) systems and beyond.

For a variety of commercial and safety reasons, a demand that the locations of mobile users be known to some accuracy, both by the mobile station and the network service provider, has arisen. Some of this demand has escalated to regulatory requirements, e.g. mobile enhanced 911 (E911), which mandates Automatic Location Identification (ALI) services beginning Oct. 1, 2001.

Position determination is sure to be a feature of mobile communications systems deployed in the future. Current provisioning of such services, however, requires that a position determination function be retrofitted to all US and many foreign operating networks to meet E911 requirements.

The original expectation, based on technology assessments, was that carriers would undertake network-based solutions for a mobile unit position, but none of the first and second generation cellular telephony systems explicitly incorporated means to do so. The FCC requirement for a network-based solution is 100 meters for 67% of calls and 300 meters for 95% of calls. With the development of commercial Global Positioning System (GPS) technology, it became clear that handset-based solutions would be possible as GPS capability became commonplace in handsets. The FCC requirements for a handset-based solution are twice as stringent as those for network-based solutions (50 and 150 meters for 67% and 95% of 911 calls, respectively).

As long as GPS operated in its intentionally degraded Selective Availability (SA) mode, it was incapable of providing the requisite accuracy. By presidential directive SA was terminated on May 2, 2000, permitting commercial GPS receivers to know their position within 10 s of meters.

Progress in meeting FCC E911, the most demanding ALI requirement, has been difficult to make. In the absence of any built-in ALI capability in cellular telephony signals, construction of a network-based solution required clever exploitation of existing signals or addition of new means. And even though a handset might know its position to sufficient accuracy from an internally or externally supplied post-SA GPS solution, no means to automatically couple such a solution into the return link to the base station was provided.

This is not to say that the problem has not been addressed. It has in fact already been approached from a variety of viewpoints. In one such conventional system, a mobile station in a cellular communications network estimates pseudorange to a plurality of base stations by measuring the arrival time of known signals, e.g. training sequences, included in the downlink communication signals transmitted by the base stations to mobile stations. With proper coordination between base stations and mobile stations some two-way ranging also may be performed. A differential time of arrival (DTOA) technique is used in such a conventional system to convert a set of pseudoranges to a position solution.

In another conventional system, each base station transmits, in addition to its communication signals, an embedded navigation signal that both provides mobile stations with a signal from which to extract signal arrival time and carries low-rate digital timing data derived from an external source, e.g. the Global Positioning System (GPS), to facilitate converting arrival time measurements to position estimates. In such a system the base station is equipped with a receiver (e.g., a GPS receiver) to provide the external timing reference. The base station also can be made to function as a pseudolite node in the external ranging system if it also provides navigation services. Proper execution of the position determination function in such systems, however, requires the external timing reference to be available at the base station, at the mobile station, or at both stations.

Theory and experiment indicate that conventional systems performing ranging using the communication signals above are not able to meet the most stringent of the position determination accuracy requirements, e.g. E911. Performance improvements are made possible by an embedded navigation signal, but the consequent dependence on external timing in the conventional systems creates an equipment burden at both the base station and the mobile stations that hampers backward compatibility. Further, such dependence is disadvantageous in that outage of the timing reference system impairs or disables the position determination function.

There is a long felt need to determine the position of mobile stations within a wireless communication network with a high degree of accuracy and without requiring substantial changes to the wireless communications network infrastructure.

SUMMARY OF THE INVENTION

Therefore, in light of the above, and for other reasons that will become apparent when the invention is fully described, an object of the invention is to accurately determine the position of a mobile station within a wireless communication network.

Another object of the invention is to embed a lower level signal in a cellular communication signal without requiring the use of a timing source external to the cellular communication system.

Yet another object of the invention is to embed a navigation signal in a communication signal while avoiding interference with the communication signal.

A still further object of the invention is to determine the position of a mobile unit with accuracy of 50 m (1 σ) or less.

The aforesaid objects are achieved individually and in combination, and it is not intended that the invention be construed as requiring two or more of the objects to be combined unless expressly required by the claims attached hereto.

In accordance with one aspect of the invention, a method of transmitting a communication signal generated in synchronization with a transmitter time base includes generating the spread spectrum signal in synchronization with the transmitter time base; and embedding the spread spectrum signal in the communication signal. An example of the spread spectrum signal is a chirp spread spectrum signal. The communication signal includes at least two frames and the chirp spread spectrum signal can include an up-chirp portion embedded in the first frame and a down-chirp portion embedded in the second frame, wherein the up-chirp portion of the spread spectrum signal is a signal linearly increasing in frequency and the down-chirp portion of the spread-spectrum signal is a signal linearly decreasing in frequency.

In accordance with another aspect of the invention, a communication signal is generated by embedding a first portion of a spread spectrum signal in a first portion of the communication signal; and embedding a second portion of a spread spectrum signal in a second portion of the communication signal. The communication signal can be a time division multiplex/frequency division multiple access (TDM/FDMA) communication signal, and the first and second portions of the communication signals can be first and second TDM frames, respectively. The first and second spread spectrum signals can be chirped spread spectrum signals in which the first spread spectrum signal is a chirp signal of a first sense, and the second spread spectrum signal is a chirp signal of a second sense, opposite to the first sense.

In accordance with yet another aspect of the invention, a method of determining a location of a mobile unit in a communication system having a plurality of transmitters, includes extracting chirp spread spectrum signals from communication signals broadcast from the plurality of transmitters; determining pseudorange measurements between the mobile unit and the plurality of transmitters based on the extracted chirp spread spectrum signals; and transmitting the pseudorange measurements to a location processing center for determining the position of the mobile unit. The communication signal can include a frame having a plurality of slots and the chirp spread spectrum signal is embedded within the frame. Extracting the chirp spread spectrum signal can include extracting the chirp spread spectrum signal only during the slots that are not used for transmission or reception of the communication signal.

The above and still further objects, features and advantages of the invention will become apparent upon consideration of the following descriptions and descriptive figures of specific embodiments thereof. While these descriptions go into specific details of the invention, it should be understood that variations may and do exist and would be apparent to those skilled in the art based on the descriptions herein.

BRIEF DESCRIPTION OF THE DRAWINGS

FIGS. 12A and 12B illustrate the early and late local reference chirp frequency-vs-time characteristics and associated correlation functions in which early and late correlation is used to track the navigation signal arrival time.

DETAILED DESCRIPTION

Figure 1:
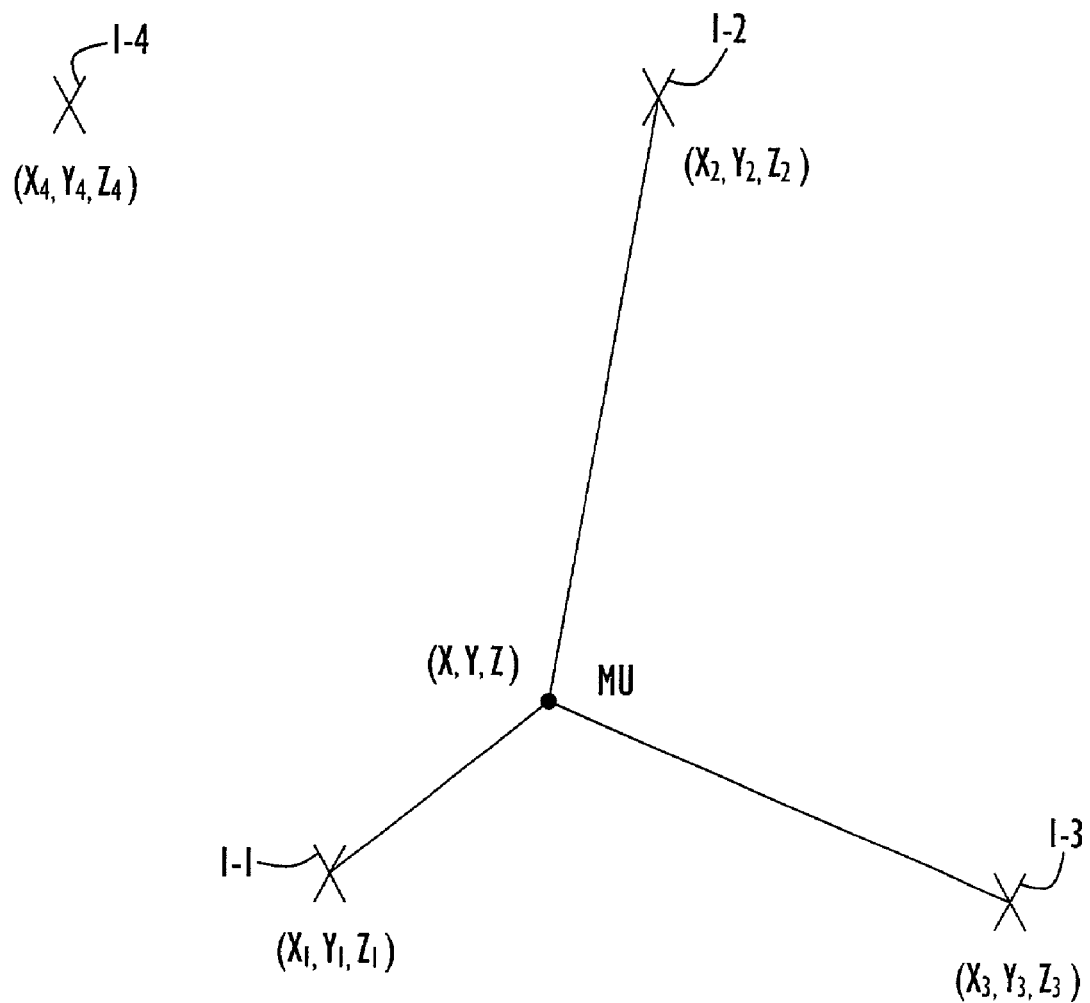
FIG. 1 illustrates a mobile station or mobile unit taking pseudorange measurements to three base stations.

Preferred embodiments according to the present invention are described below with reference to the above drawings, in which like reference numerals designate like components.

Overview

Systems and methods are described here for locating the position of a mobile terminal in a cellular communication system, such as the Global System for Mobile Communications (GSM). The communication system includes a network of transmitting and receiving base stations, at least one mobile unit and signals transmitted between the base station and the mobile station. Time-division-multiplex/frequency-division-multiple-access (TDM/FDMA) communication signals are examples of signals the base stations transmit to mobile units. In addition the base stations can also transmit a linear frequency modulated (FM), or chirp signal that is synchronized to the communications frame structure of the base station. The chirp signal can include an up-chirp portion for one frame followed by a down-chirp portion in the subsequent frame, repeated periodically. The lower and upper frequency limits of the chirp signal lie inside or coincide with the edges of the system operator's spectrum allocation. In time slots during which the mobile unit is neither transmitting communications to a base station, receiving communications from a base station, nor adjusting its local oscillator frequency for subsequent transmit/receive operations, the mobile unit receives a contiguous portion of the chirp signal and makes an arrival time, or pseudorange measurement based on that portion of the chirp signal. Pseudoranges taken from adjacent, opposite sense chirp portions can be averaged to remove pseudorange errors due to frequency uncertainty. A set of these pairwise averages can be accumulated and processed for noise and interference removal over a position update interval. Measurements made with the receiver's local reference chirp displaced in frequency in a positive and negative sense permit early-late tracking of pseudorange. No external timing source, e.g. GPS receiver, is required to be employed at either the base station or in the mobile terminal. Repeating this pseudorange measurement process with a plurality of base stations provides sufficient data to obtain a position solution. The mobile terminal may either compute its position itself or communicate the raw pseudorange measurements back to a base station, from which the cellular network performs position determination. That is, either a network- or handset-based solution is possible.

FIG. 1 shows a mobile unit (MU), such as a cellular mobile receiver, at a three-dimensional location (x, y, z) communicating with three base stations 1-1, 1-2 and 1-3 at different locations. A fourth base station 1-4 is also shown but is not communicating with the mobile unit. The mobile unit upon receiving signals from base stations 1-1, 1-2 and 1-3 uses information in those signals to determine its position in two dimensions. If its position in three dimensions is required then measurements from four base stations are used. The signals transmitted from each base station include conventional Global System for Mobile Communications (GSM) communication signals plus an embedded navigation signal described herein. In accordance with certain aspects of the invention the embedded navigation signal is slaved to the timing of the GSM communication signals, and thus, no external timing source is required of the mobile or base stations. An operator's spectrum allocation of 5 MHz of bandwidth is used in describing the preferred embodiments that follow, although other bandwidths can be used.

Embedded Chirp Navigation Signal

Figure 2:
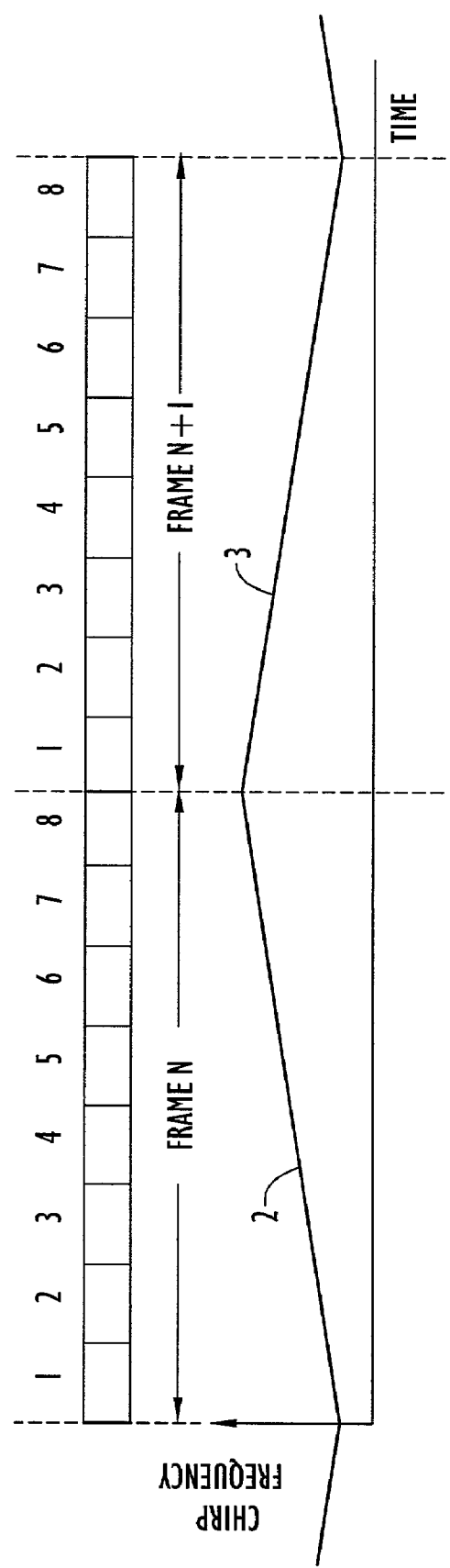
FIG. 2 illustrates a frequency-vs-time characteristic of a chirp signal embedded in two consecutive frames of a communication signal.

An exemplary embedded navigation signal is shown in FIG. 2. Preferably, the navigation signal is a wideband 5-MHz bimodal linear chirp, i.e. an up-chirp portion of the signal 2 followed in sequential fashion by a down-chirp portion of the signal 3. The bimodal chirp signal is synchronous with the GSM frame structure. The duration of a one-way sweep portion of the signal, either the up or down chirp, is one GSM frame, i.e., 4.6 ms, although other sweep durations are not precluded. As shown in FIG. 2, the up-chirp portion 2 is synchronized with a frame N and the down-chip portion 3 is synchronized with the succeeding frame N+1. Preferably, the navigation chirp signal repeats indefinitely, with a repetition period of two frames.

Each GSM frame is divided into eight equal length time slots, numbered 1 through 8 in FIG. 2, of duration 577 µs. While receiving a frame with the embedded chirp signal the mobile station processes at least three consecutive time slots of the chirp, amounting to a bandwidth excursion of at least (3/8)×5=1.875 MHz when no sign reversal of the chirp is encountered, from which measurements are made to extract pseudorange to the base station.

Figure 3:
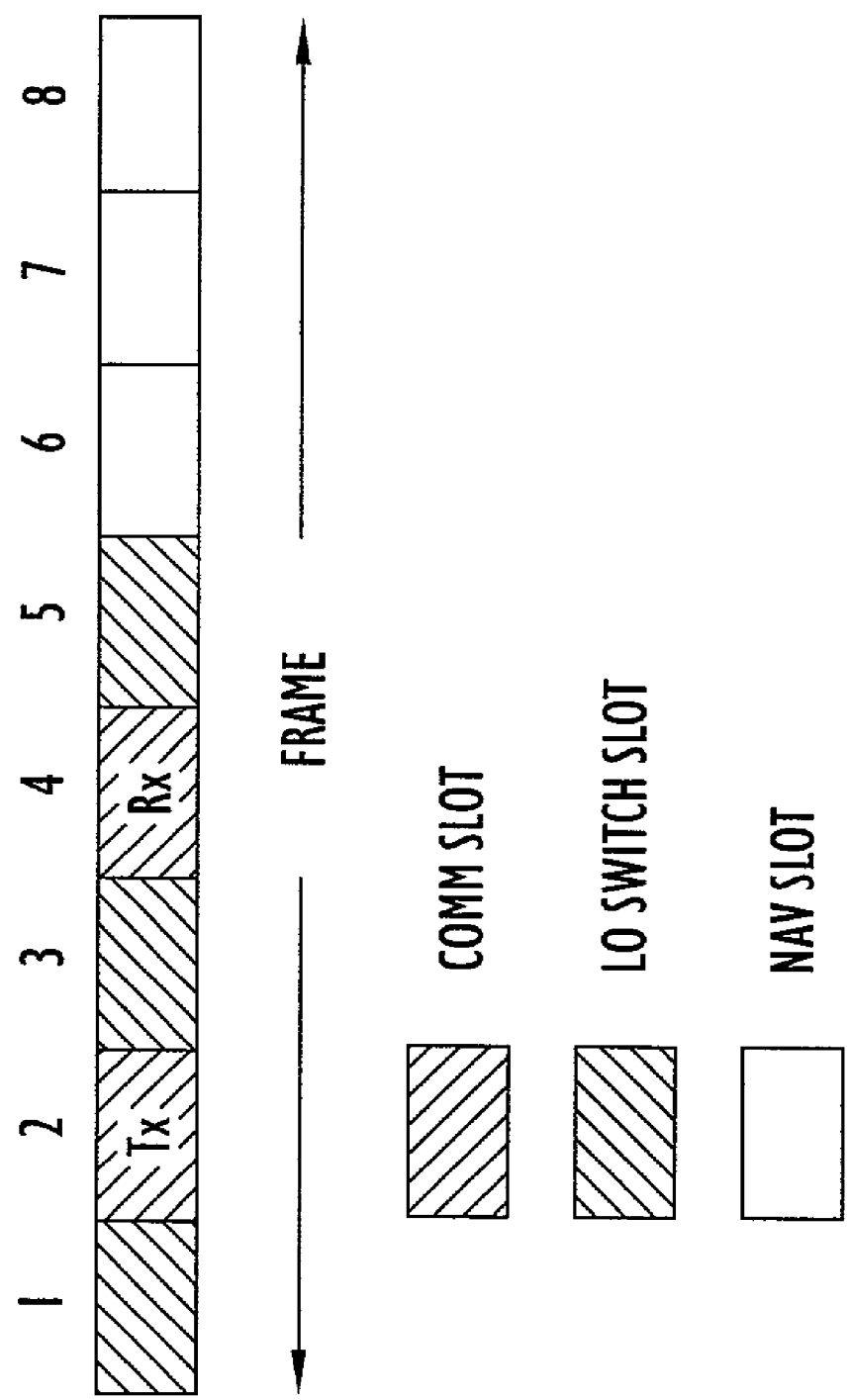
FIG. 3 is a diagram showing a cellular mobile receiver's utilization of time slots within one GSM frame.
Figure 4:
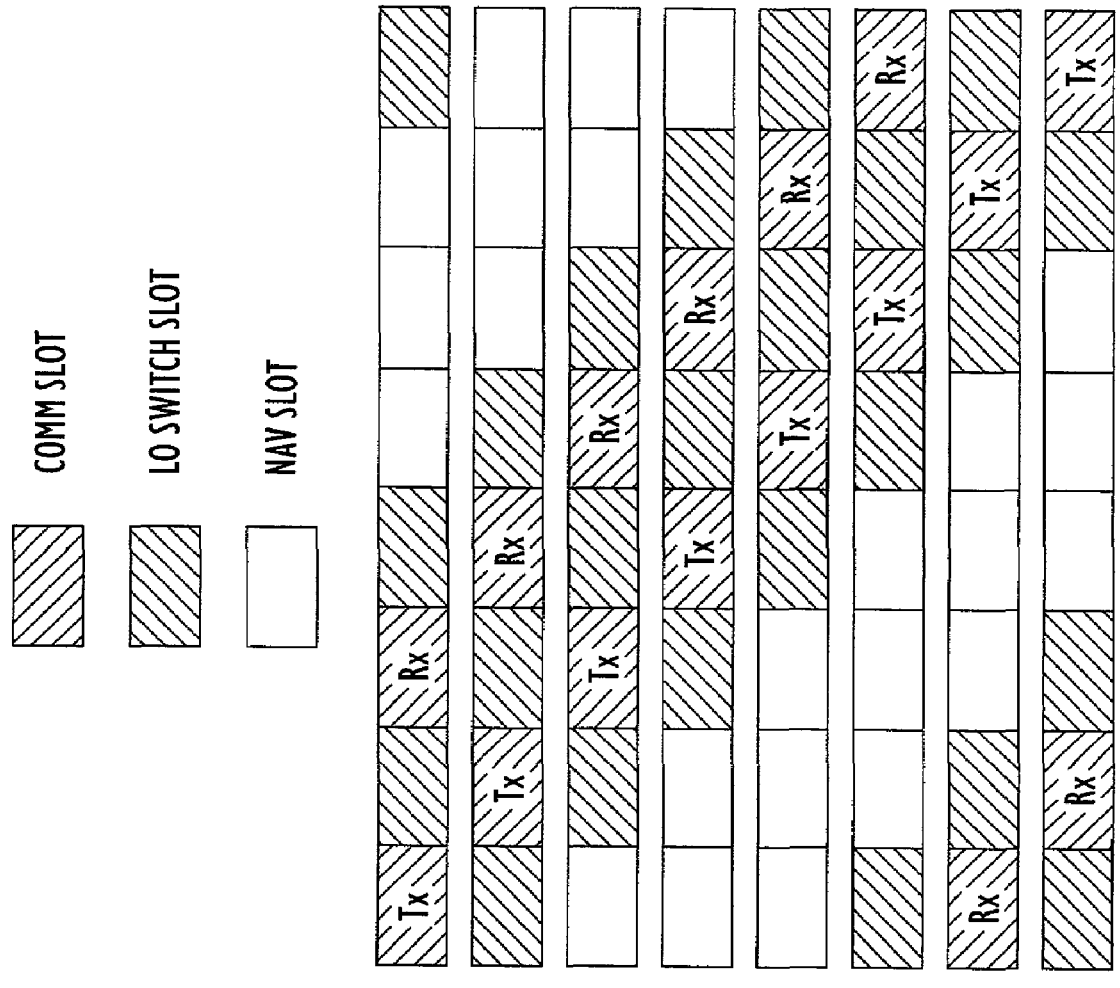
FIGS. 4A–4H illustrate the possible locations of navigation slots vs. location of communication slots in GSM frames.

FIG. 3 illustrates a mobile unit's typical utilization of the time slots in one GSM frame. Each mobile unit is assigned one slot per frame for transmission (Tx) of communications, and a second slot for reception (Rx). These two slots are specified to be non-overlapping so that the mobile unit need not perform transmission and reception simultaneously and they are separated by one time slot. In FIG. 3, slot 2 is the transmission (Tx) timeslot and slot 4 is the reception (Rx) time slot for the mobile unit.

According to regulations for the mobile communication bands, the signals in the transmission and reception slots are spaced apart 45 MHz in frequency. During the intervening time slot, i.e., slot 3 in FIG. 3, the receiver's local oscillator (LO) switches from the transmission frequency to the reception frequency. Due to the physical properties of the oscillator, this switch is not instantaneous and may require most or all of the intervening time slot to slew to and settle at the new frequency. Therefore, the mobile unit is capable of neither transmission nor reception during the intervening time.

Normally the mobile unit performs no communication functions during the six time slots not scheduled for either transmission or reception. It is during these slots, then, that the mobile unit may receive the navigation signal. To do so it must reset the LO frequency to the expected chirp frequency to begin reception. This reset is not instantaneous but can be accomplished in no more than one time slot. As shown in FIG. 3, the time slot 1 immediately preceding the first communication slot 2 and the time slot 5 immediately following the second communication slot 4 are consequently unavailable for navigation signal reception as the LO switches frequencies during those times. For the same reason slot 3 is unavailable for navigation signal reception. Thus, five of the eight slots are eliminated for navigation use, two for communications and three for LO reset. Navigation reception thus is confined to the remaining three slots, namely slots 6, 7 and 8 shown in FIG. 3.

FIGS. 4A–H shows all eight possible arrangements of the two communication slots within a frame. From this presentation it is evident that no matter where in a frame the communication slots are located, three adjacent time slots will be available for navigation reception. In two of the eight arrangements, namely those shown in FIGS. 4C and 4D, the navigation slots overlap a frame boundary, as discussed below. In the remaining six arrangements, namely those shown in FIGS. 4A, 4B, 4E, 4F, 4G and 4H, the navigation slots do not overlap a frame boundary.

Figure 5:
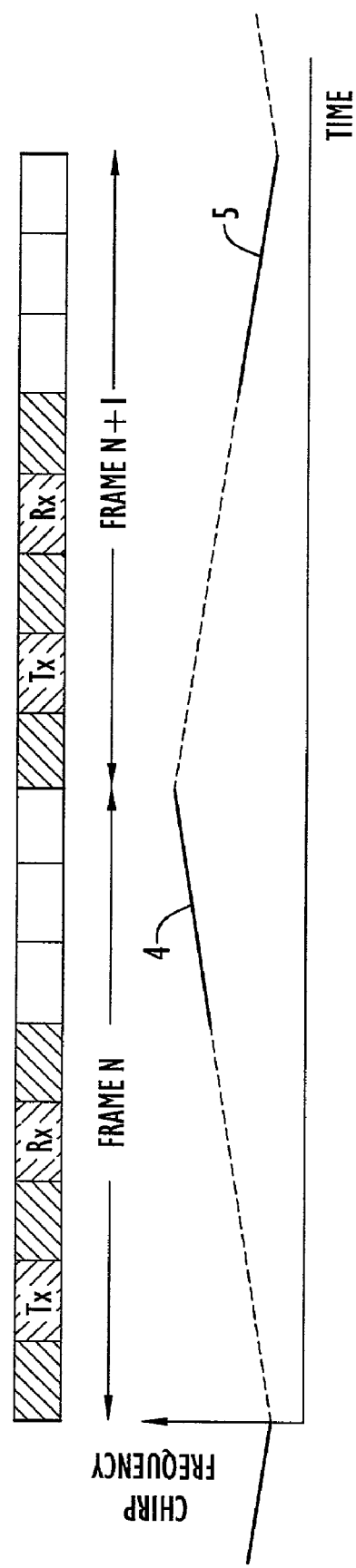
FIG. 5 illustrates the use by a cellular mobile receiver of the received chirp signal in which chirp processing is enabled only during certain contiguous intervals belonging to a single frame.
Figure 6:
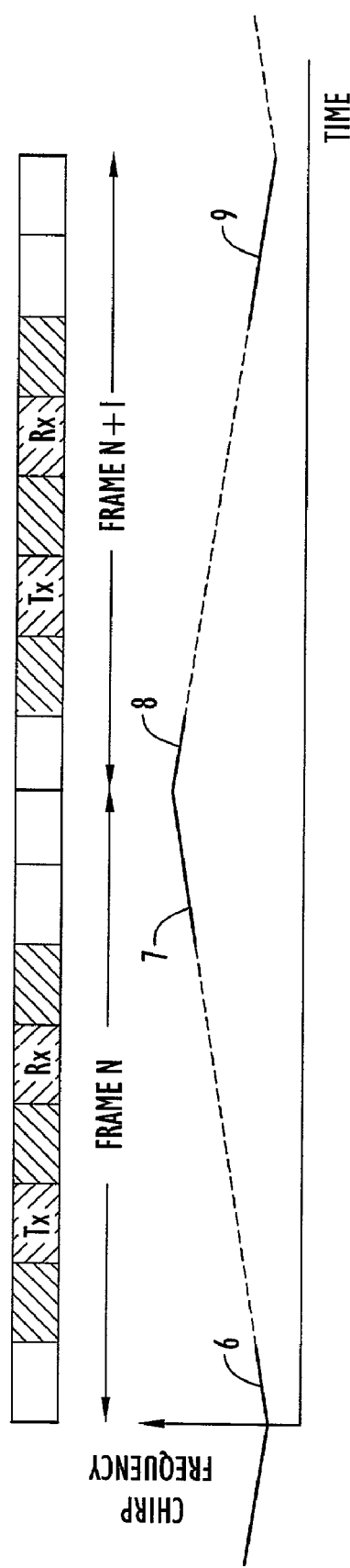
FIG. 6 illustrates the use by a cellular mobile receiver of the received chirp signal in which chirp processing is enabled only during certain contiguous intervals belonging to two adjacent frames.

FIG. 5 shows the frame structure and the chirp frequency vs. time curve for a case in which the contiguous navigation slots lie within one frame. For all six such arrangements (only one of which is shown in FIG. 5) the mobile unit's receiver sees a linear chirp. For example, the receiver detects and processes a portion of the up-chirp signal 4 and a portion of the down-chirp signals 5 occurring during the last three slots of frames N and N+1, respectively. In FIG. 6, the receiver detects and processes a first portion of the up-chirp signal 6 during the first slot of frame N and a second portion of the up-chirp signal 7 during the last two slots of frame N. Similarly, the receiver detects and processes a first portion of the down-chirp signal 8 during the first slot of the next frame, frame N+1, and a second portion of the down-chirp signal 9 during the last two slots of frame N+1. Accordingly, a chirp signal is processed over three contiguous slots (e.g., slots 7 and 8 of frame N and slot 1 of frame N+1). Hence, in the two frames shown in FIG. 6, the received and processed chirp changes direction for one of the three time slots.

Optimum Pseudorange Processing

Figure 7:
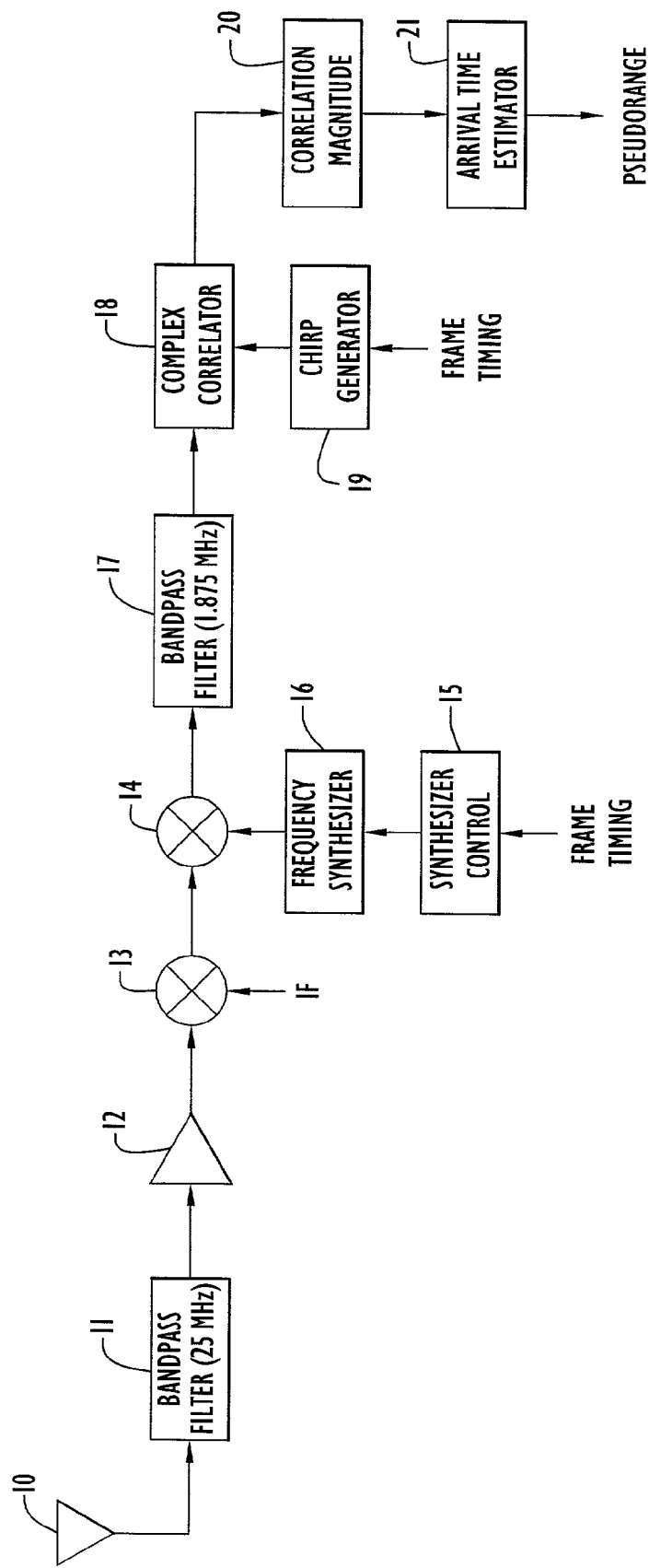
FIG. 7 is a block diagram of a cellular mobile receiver in which the processing of an embedded chirp signal is optimized for a signal-plus-noise environment.

A receiver suitable for use in a wireless communication network and that performs the theoretically optimum processing of the navigation signal for a noise-only environment is shown in FIG. 7.

The communication signal with the embedded chirp navigation signal is received at a mobile unit by an antenna 10. The antenna passes the received signal to a bandpass filter 11 which filters the received signal to 25 MHz. An amplifier 12 amplifies the band-limited signal and outputs the amplified signal to a first mixer 13 which mixes the amplified signal with an intermediate frequency (IF) signal. The signal output from the first mixer is applied to a second mixer 14 which further translates the signal based on frame timing data applied to a synthesizer controller 15 and a frequency synthesizer 16. The frame timing data determines where within the frame the chirp processing slots are located and the consequent frequency range spanned by the chirp, from which the appropriate mixing frequency is selected. The second translation serves to place the signal in a fixed band of width approximately 1.875 MHz and confines it to said band by way of a second bandpass filter 17. The band selection is controlled by commands that set the synthesizer output to one of six constant frequencies.

Band selection is controlled by commands that set the synthesizer output to one of six constant frequencies separated by (⅛)×5 MHz=625 kHz, the frequency sweep over one time slot duration. These frequencies are offsets of the chirp frequencies at the beginning of the first six time slots of an up-chirp. Denoting the first of these frequencies by $f_1$, the n-th frequency is $f_n = f_1 + (n-1) \times 625$ kHz, $1 \leq n \leq 6$.

The time bases of the transmitted communication and navigation signals are slaved, thus the receiver always knows which frequency to use within a given navigation slot.

Figure 8B:
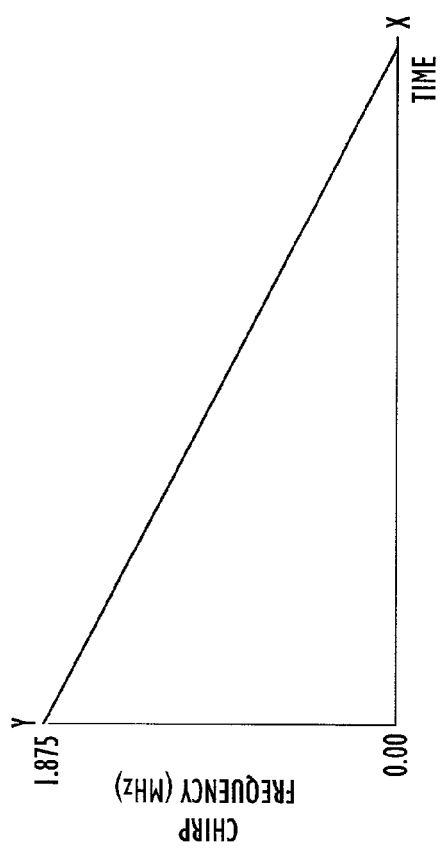
FIGS. 8A–8F illustrate the six possible local reference chirp frequency-vs-time characteristics of a cellular mobile receiver in which the chirp is observed over three arbitrary but contiguous time slots.
Figure 8A:
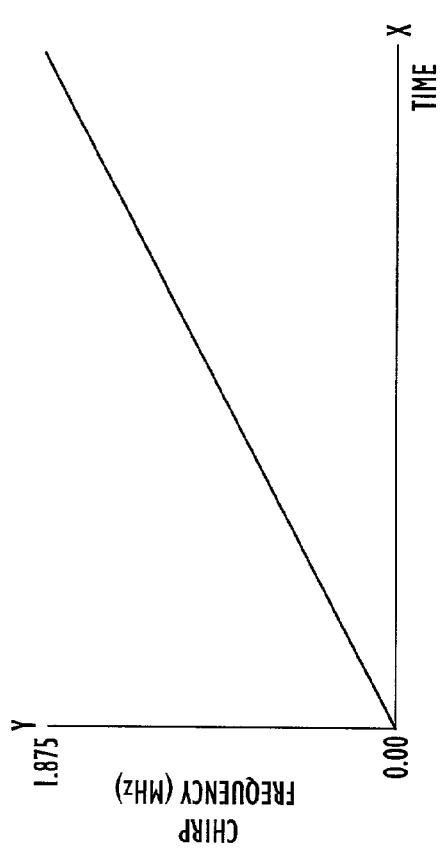
Figures 8C, 8D:
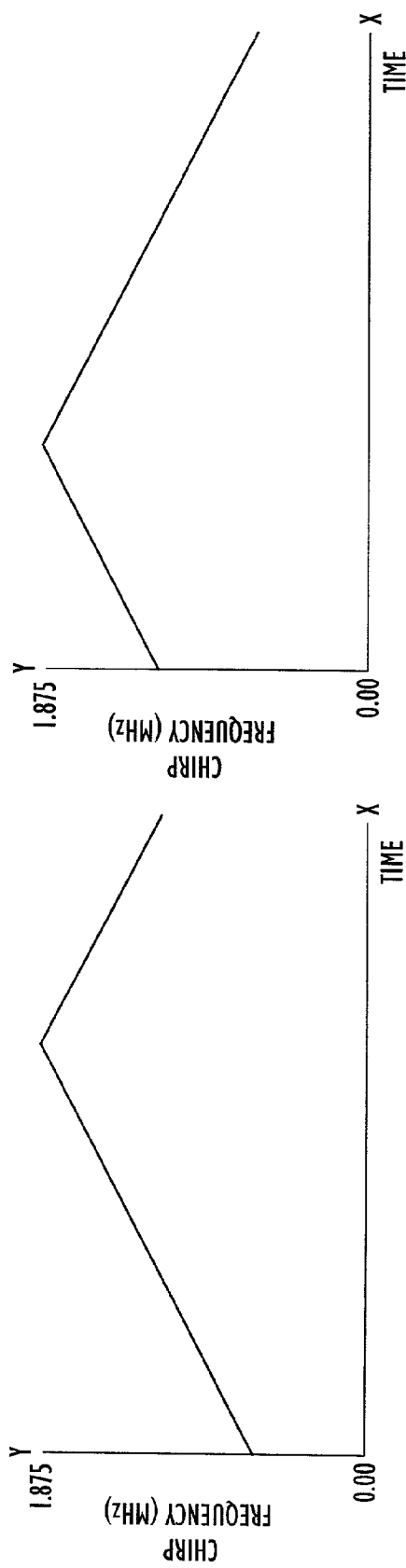
Figures 8E, 8F:
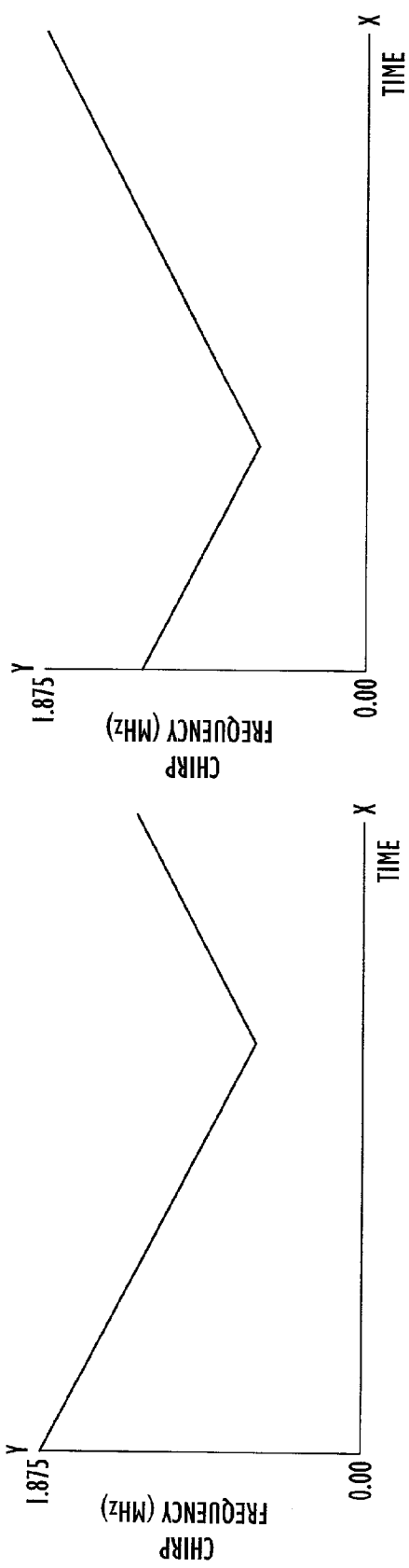

After the signal is filtered to reject noise and interference lying outside the 1.875 MHz band it is passed to a correlator 18 whose local input is one of six possible reference functions shown in FIGS. 8A–F. Since the time bases of the transmitted communication and navigation signals are slaved, the receiver always knows which reference function to use within a given navigation slot. FIGS. 8A and 8B show the reference functions for use when the chirp to be processed maintains a constant sense (up or down) across the three contiguous navigation slots that are processed, with FIG. 8A showing a reference function for three contiguous time slots for an up chirp signal, and FIG. 8B showing a reference function for three contiguous time slots for a down chirp signal. FIGS. 8C–8F illustrate the reference functions for use when the three navigation slots cross a frame boundary. The reference function in FIG. 8C is used to detect and measure an up chirp navigation signal present in the last two time slots of a frame and a down chirp navigation signal present in the first time slot of the succeeding frame. Similarly, FIG. 8D shows a reference function for detecting and measuring an up chirp signal present only in the last slot of the frame followed by a down chirp signal present in two slots of the succeeding frame. FIG. 8E shows a reference function for detecting and measuring a down chirp signal present in the last two slots of a frame followed by an up chirp signal present in the first slot of the succeeding frame. FIG. 8F illustrates a reference function for detecting and measuring a down chirp signal present in the last slot of a frame followed by an up chirp signal present in two time slots of the succeeding frame.

Figure 9:
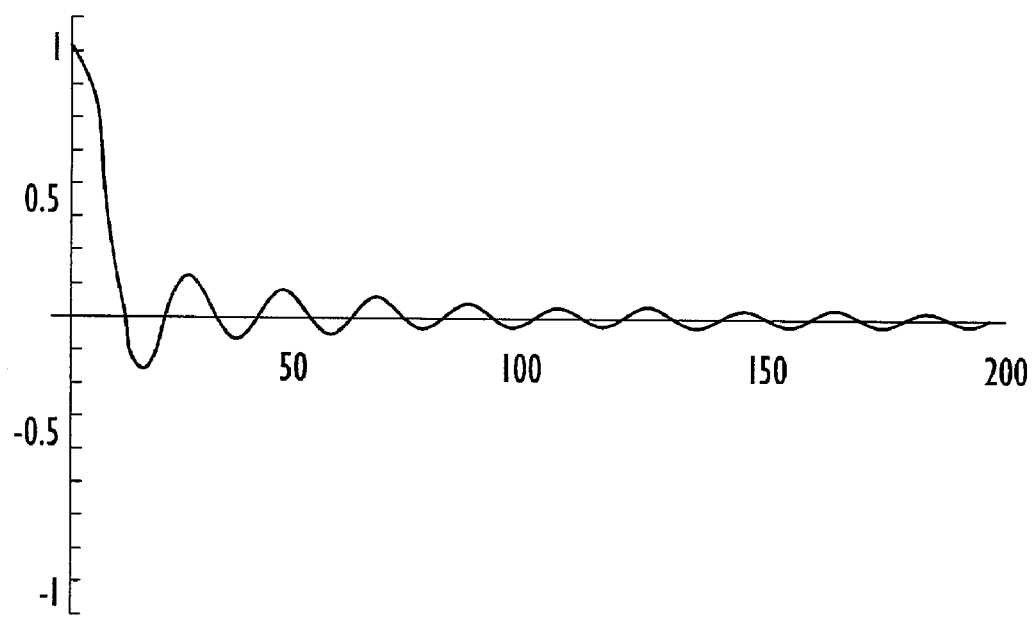
FIG. 9 is a graph illustrating an autocorrelation function of a cosine chirp signal.
Figure 10:
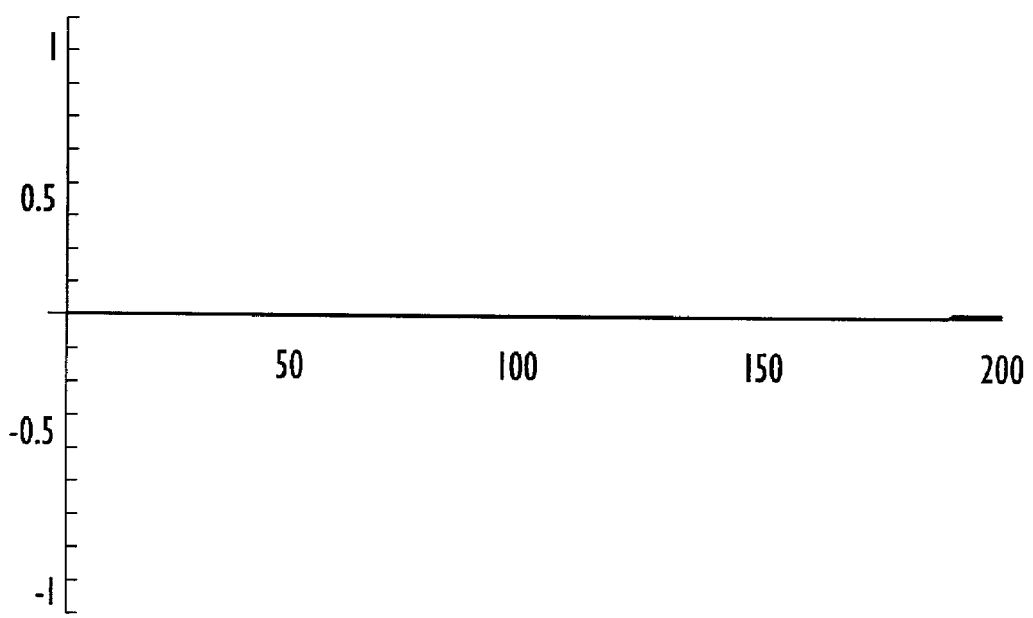
FIG. 10 is a graph illustrating a cross-correlation function of cosine and sine chirp signals.

Since the received RF phase of the received chirp signal is unknown, the correlation signal processing accounts for this by correlating the received signal with quadrature chirp reference signals generated by chirp generator 19 driven by frame timing information. The received chirp may be written as $\cos(2\pi f_o t + \mu t^2/2 + \phi)$, where $\mu$ is the chirp rate and $\phi$ is an unknown phase assumed to remain constant over the measurement interval. FIG. 9 shows the baseband component that results when a chirp of the above form in which the phase is set to $\phi=0$ is autocorrelated; the envelope has the expected sin x/x shape. In FIG. 10 the same chirp is correlated with a quadrature reference, $\sin(2\pi f_o t + \mu t^2/2)$; the resulting cross-correlation is small everywhere. As long as the time-bandwidth product of the chirp segment is large, the quadrature chirps may be regarded as orthogonal. Denoting the two results of crosscorrelating the orthogonal references with the incoming signal as I and Q, respectively, time of arrival (TOA) measurements are made on the envelope function $\sqrt{I^2+Q^2}$. Again with reference to FIG. 7, a correlation magnitude unit 20 determines the envelope magnitude and an arrival time estimator 21 determines the TOA, and hence, the pseudorange from the correlation magnitude.

Alternatively, quadrature chirp processing is avoided by applying a phase-lock loop (PLL) to a single component to co-phase the received and reference signals. In this alternative embodiment the complex correlator 18 is replaced by a real-valued, or single quadrature component correlator, and the chirp generator 19 is driven by both frame timing information and the output of a PLL. This PLL takes as input the output of the real-valued correlator and produces as its output a phase correction that is supplied to the chirp generator 19 for the purpose of matching the phase of the reference output of 19 to the phase of the correlator input. When these phases are matched, the correlator output signal is the strongest possible, thereby maximizing the signal-to-noise ratio in and accuracy of the subsequent measurements.

In either embodiment the magnitude of the correlator output is computed by the correlator magnitude unit 20 and passed to an arrival time estimator unit 21 that extracts TOA. In an environment with signal-plus-noise only, the best estimate of TOA is the time at which the correlation output takes on its maximum value. In multipath environments the estimate may be based on the time of the earliest peak, although other techniques can be used. Here, a TOA measurement is equivalent to a pseudorange measurement. Although FIG. 7 shows the arrival time estimator 21 present in the mobile unit, the correlation magnitudes can be transmitted to a location elsewhere in the network for processing.

Further processing can account for the presence of interfering signals, and is discussed as part of the preferred pseudorange processing section below.

Preferred Pseudorange Processing

The optimum processing described above requires a new type of receiver over the presently installed base. A conventional GSM receiver has neither the frequency synthesizer 16 to convert the incoming signal into one of the six specific bands needed for chirp processing nor the 1.875 MHz bandpass filter 17 needed to isolate the multi-slot chirp portion from out-of-band noise or interference. Nor does it contain a software or firmware chirp generator 19. The method described next has a high degree of backward compatibility with existing GSM receivers and is preferred since in many cases it can be implemented via software changes that achieve the objectives of the optimum receiver, FIG. 7, but do so without ever having to process a chirp signal segment in a bandwidth wider than the bandwidth of a GSM communication channel, about 200 kHz.

Figure 11:
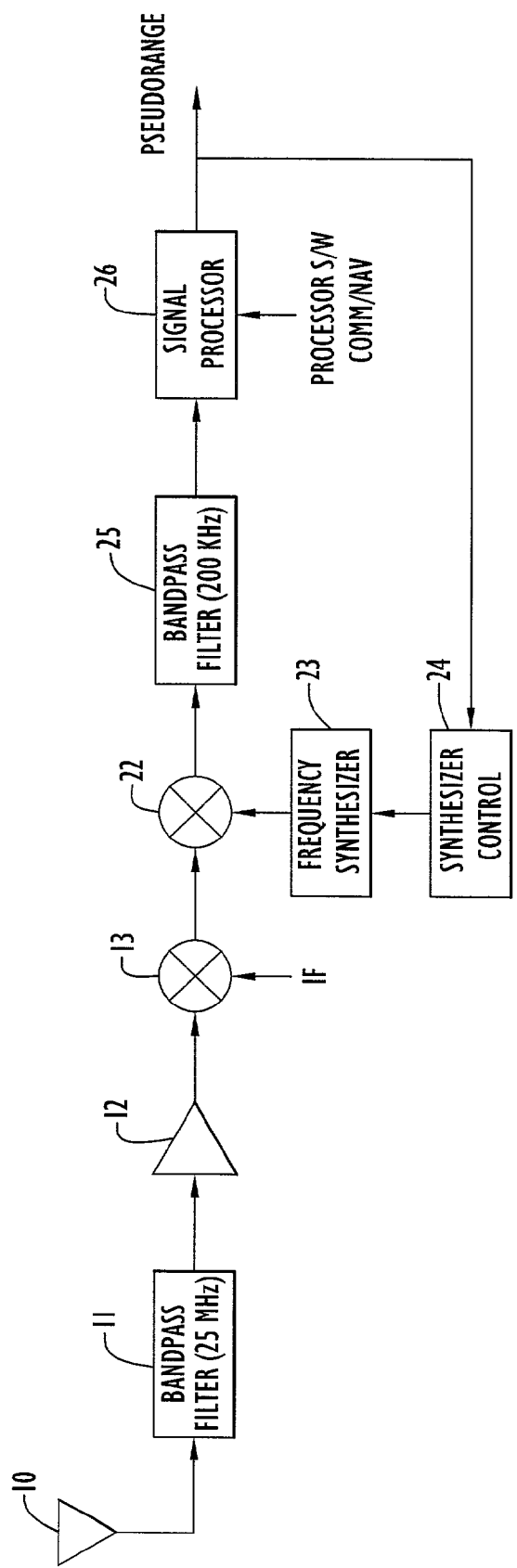
FIG. 11 is a block diagram of a cellular mobile receiver in which processing of the embedded chirp signal is designed to preclude changes to the receiver hardware and minimize the impact on the receiver software.

A mobile unit receiver suitable for use in a wireless communication network and that requires only software changes to use the chirp navigation signal is illustrated in FIG. 11. As with the receiver shown in FIG. 7, the mobile receiver here includes antenna 10 and first bandpass filter 11, preferably with a 25-MHz band, outputting a band-limited signal to amplifier 12. The amplified signal is output to first mixer 13 that mixes the received signal with an IF frequency to down convert the signal to an IF signal. The down converted signal is applied to a second mixer 22 which mixes the IF signal with a local oscillator signal provided by a frequency synthesizer 23 and under control of a synthesizer controller 24. The signal resulting from mixing the first IF output signal and the synthesized chirp signal is applied to a second band-pass filter 25 that has a 200 kHz pass band and which ideally outputs a single frequency signal. This second band-pass filter 25 is already part of the conventional GSM receiver. The bandpass filter output is applied to a signal processor 26 that performs the communication and navigation functions, preferably using software. This signal processor is already resident in the conventional GSM receiver to perform communications processing, preferably in software. During time slots in which the chirp navigation signal is being processed the processor is loaded with an alternative set of software that performs the chirp processing. This software swapping is indicated in FIG. 11 as an input to the signal processor 26.

A pseudorange signal is output from the signal processor 26 that is fed back to the synthesizer controller 24 to control the local oscillator frequency based on the measured pseudorange.

Up to the first IF down conversion mixer 13 the receiver shown in FIG. 11 is identical to the receiver shown in FIG. 7. The functionality of the second down conversion is different, however. Whereas in FIG. 7 the second down conversion was performed according to one of six fixed frequencies, the comparable down conversion in the receiver of FIG. 11 serves to track the instantaneous frequency of the incoming chirp signal and mix it to a constant frequency. This frequency may be almost any frequency within the channel pass band but is preferably the center frequency of the band, i.e. the carrier frequency of the communication channel corresponding to that band. This frequency additionally may be offset by any amount needed to compensate for the details of an individual vendor's receiver frequency plan, in particular the frequency location of the channelized bandpass filtering. The resulting signal then can be processed within the standard bandwidth of one GSM channel, approximately 200 kHz, as opposed to the optimum 1.875 MHz shown in FIG. 7, to avoid a receiver hardware change, thereby allowing chirp navigation signals to be used with legacy mobile units.

One of the six frequency patterns shown in FIGS. 8A through 8F is produced by the synthesizer 23 as a function of where the receiver's allocated communication slots lie and the sense of the current chirp. The result of beating the first mixer output 13 and the synthesizer output is a sinusoid lying in the middle of a GSM channel. The complex outputs of the channel bandpass filter 25 are fed to the signal processor 26 and accumulated coherently over the observation period.

Coherent accumulation consists of multiplying the sampled input signal by the samples of a reference sinusoid at the expected frequency and summing the products, where the expected frequency is determined by the receiver's current position and time estimates. If the input and reference frequencies coincide, the accumulated value will be large and will indicate that the receiver position estimate is correct and does not require an update. Any deviation between the two frequencies indicates a tracking error that can be corrected.

The processing described above produces a single point on the cross-correlation between the received chirp and the reference signal. By itself, a single point is inadequate to yield an arrival time estimate. Nevertheless, the signal processor 26 tracks the chirp frequency in a simple manner. According to FIG. 12A, consider a first up-chirp frame wherein the receiver processes as described above, but with the reference chirp signal 27 offset in frequency by a constant amount +Δf from the tracked estimate 28. Now consider a second up-chirp frame wherein the reference chirp 29 is offset by an amount −Δf from the tracked estimate 30. Receiver processing of each frame produces a correlation point, shown in FIG. 12B. If the initial frequency estimate is correct, the two correlation points symmetrically straddle the correlation peak; but if there is error in the estimate, the points are asymmetric, with the one closer to the peak being larger. Used in an early-late tracking mode, which estimates the location of the peak from a pair of early and late correlation observations, two successive correlation points computed as above generate a new frequency estimate from which to iterate the process over succeeding frames and track the changes in frequency, arrival time and pseudorange.

Further processing methods can be used to account for the following: (1) frequency uncertainties and Doppler shifts, (2) signal-to-noise ratio (SNR) and (3) interference among signals received from multiple base stations.

(1) Frequency uncertainties have opposite effects on opposite sense chirps. Therefore pseudoranges taken from adjacent, opposite sense chirp are averaged to remove pseudo-range errors due to frequency uncertainty.

(2) The correlation output SNR of a single frame is normally too low to yield measurements of sufficient accuracy. To increase the SNR and associated measurement accuracy, averages are accumulated and processed over a position update interval. Preferably the position update interval is 1 second, but other update intervals are not precluded and can be used.

(3) As the chirp sweeps the 5-MHz band, it will cross portions of the spectrum where the mobile unit's local base station is transmitting communications. With a frequency reuse factor 4:1 whereby any base station is allocated one out of every four FDMA channels, local base station communications will be encountered 25% of the time. The received chirp can be blanked during those known intervals for interference mitigation, and the very modest impact of these "missing pieces" of the chirp can be assessed from the autocorrelation functions, before and after blanking.

Figure 13A:
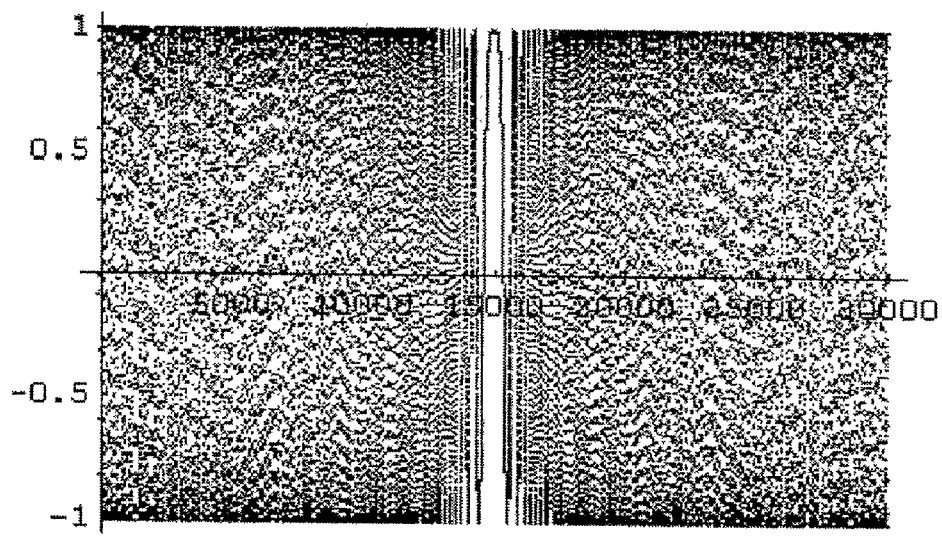
FIG. 13A is a waveform function for a full chirp signal.
Figure 13B:
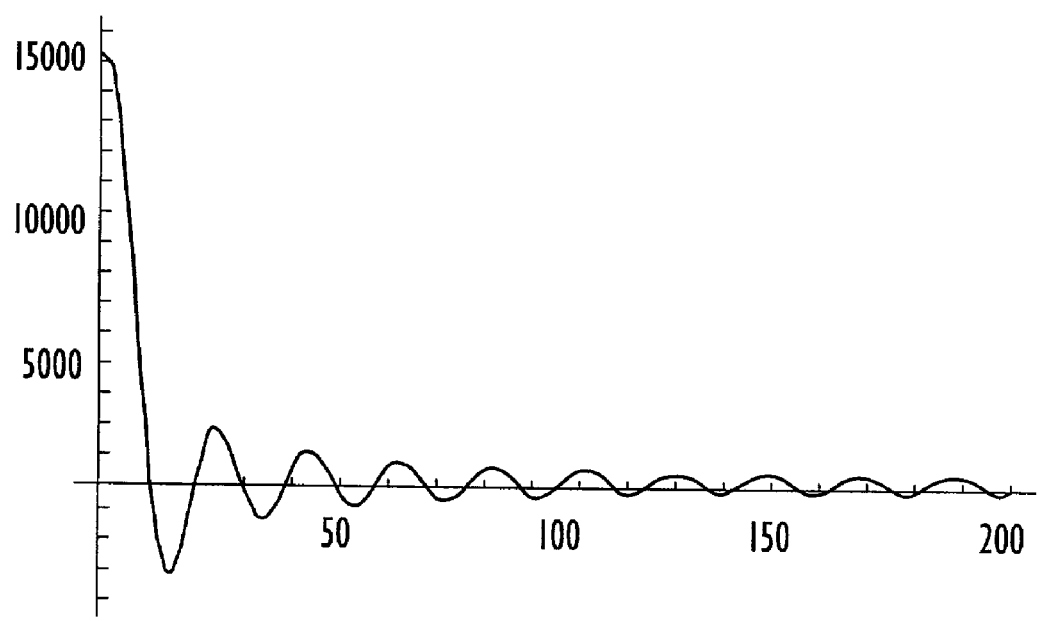
FIG. 13B is a graph of an autocorrelation for a full chirp signal.
Figure 14A:
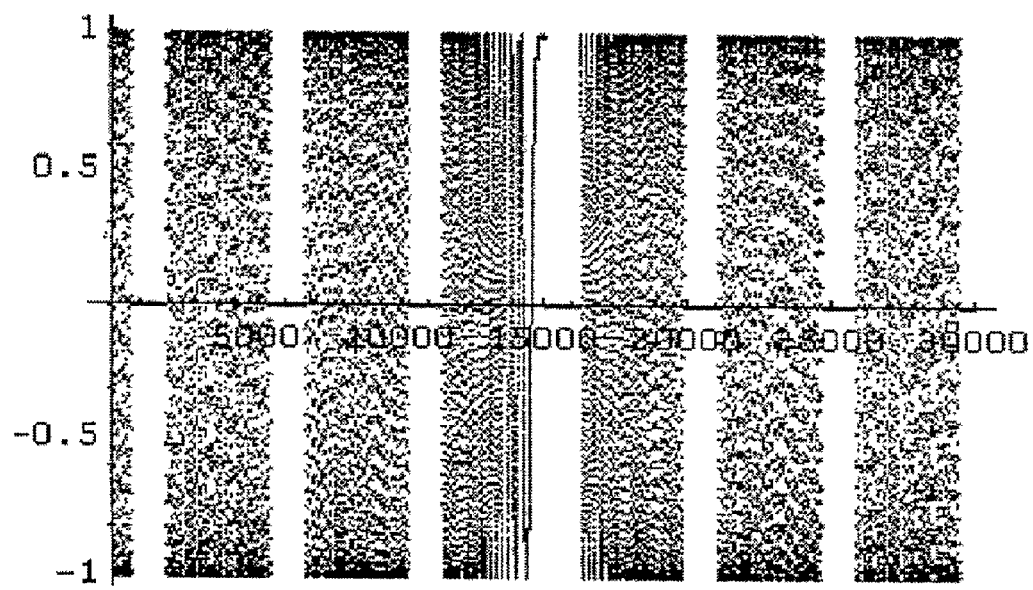
FIG. 14A is a waveform function for a 25%-blanked chirp signal.
Figure 14B:
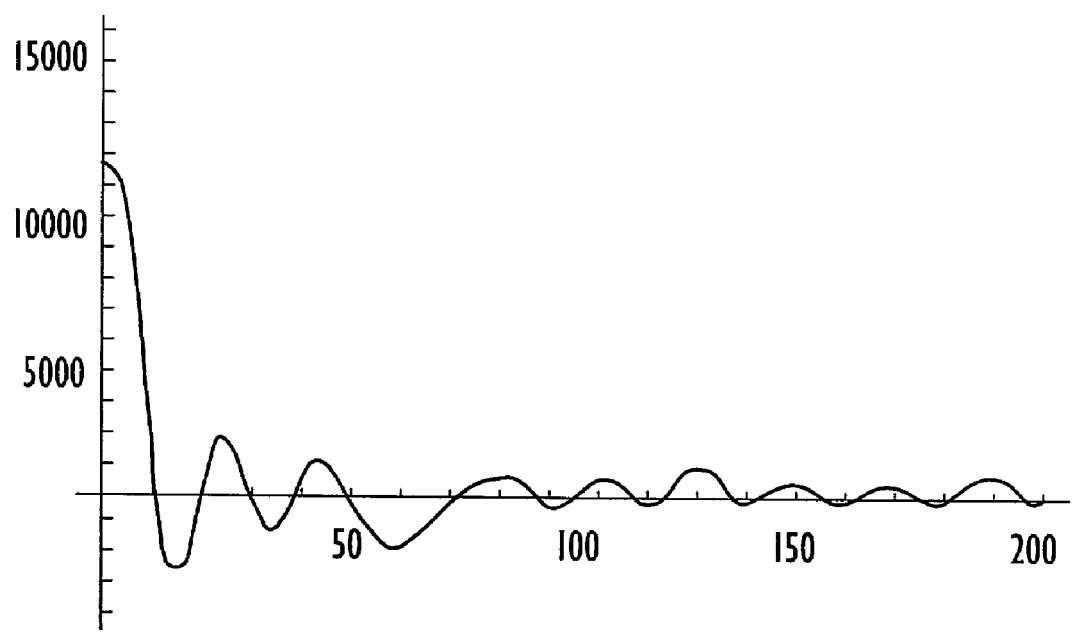
FIG. 14B is a graph of an autocorrelation function for a 25%-blanked chirp signal.

The energy of the received signal is manifest in the autocorrelation function as amplitude; the ability to resolve arrival time is manifest in the curvature of the autocorrelation mainlobe near the peak. FIGS. 13A and 13B show the waveform and autocorrelation functions of a full chirp. FIGS. 14A and 14B show the same quantities for a chirp that has been 25% blanked. Since there are 25 200-kHz subbands in 5 MHz, six 25% duty factor gaps are present due to blanking. The two autocorrelation functions, of FIGS. 13B and 14B, show that the impact of blanking is almost entirely represented by the energy loss of (¾=) 1.25 dB, amounting to about a 15% increase in range error. There is no accuracy impact due to either mainlobe distortion or slight changes in the sidelobe structure.

The method described thus far produces an accurate pseudorange once per position update period. Repeating this process with another two or three base stations provides sufficient data to obtain a position solution. In acquiring the signal from a second, third or fourth base station, the mobile unit does not execute all the call processing functions required to set up the primary communication link. It is sufficient to use the frequency and synchronization bursts to achieve time and frequency lock prior to receiving the base station's navigation signal.

With regard to the computation of position, the mobile station can compute position itself. Alternatively, the mobile station can communicate the raw pseudorange measurements back to its local base station, from which the cellular network determines the mobile unit's position.

Figure 15A:
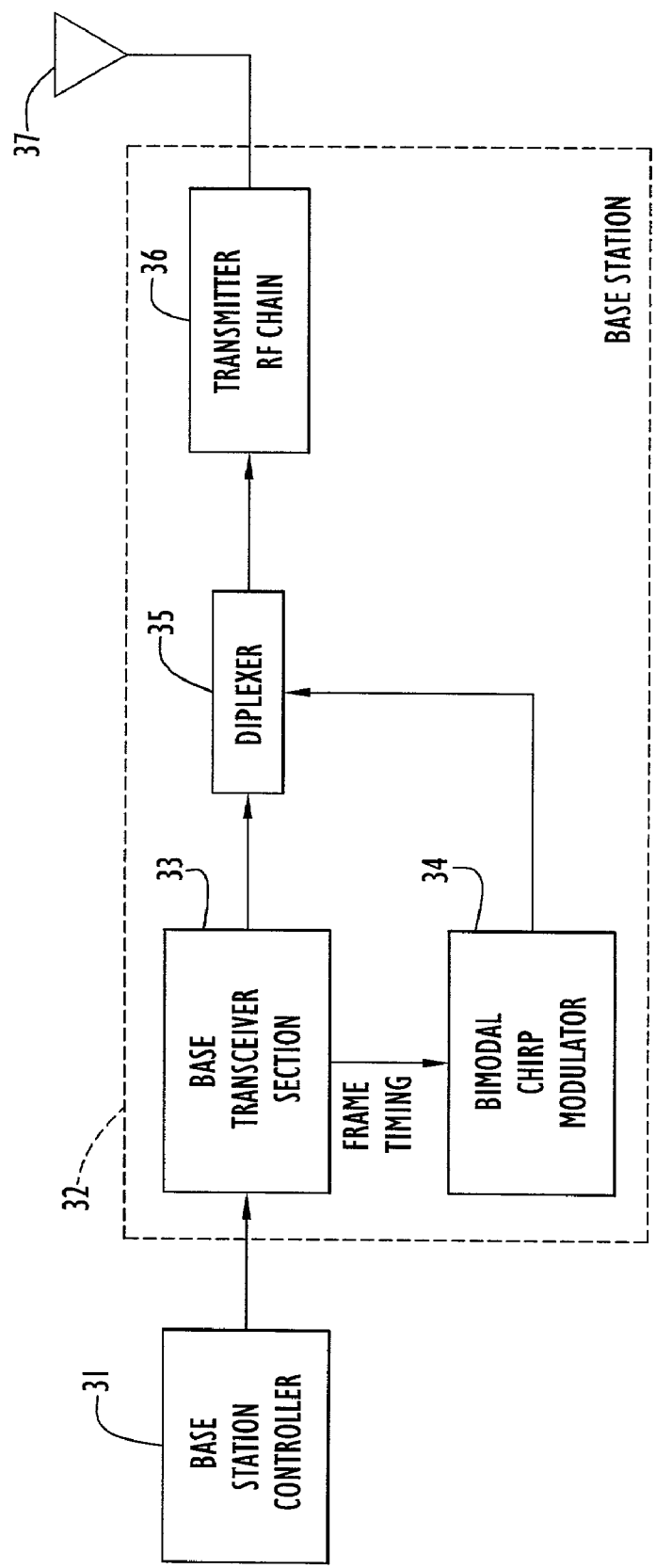
FIG. 15A is a block diagram of the base station transceiver section in which the navigation and GSM communication signals are diplexed and transmitted through a common antenna.

FIG. 15A shows an architecture of a base station 32 suitable for use in a GSM wireless communication network, to which is added, in order to embed a chirp navigation signal, a second signal generator 34 emitting a low power, wideband navigation signal confined to the operator's allocated GSM spectrum. The navigation signal power can be designed to balance the conflicting demands of position determination accuracy and mutual interference between the navigation and communication signals. Preferably, the navigation signal power is set to 1% (−20 dB) of the communication signal power. The second generator 34 is synchronized to the communications frame structure. Its output is subsequently passed through upconverters, filters and amplifiers. More specifically, in FIG. 15A a conventional base station controller 31 outputs a communication signal to be transmitted to a mobile unit by way of a legacy transmit antenna. The base station controller 31 outputs the communication signal to a base station transceiver section 33. The base station transceiver section outputs frame timing to a bimodal chirp modulator 34 that generates the bimodal chirp navigational signal. The bimodal chirp modulator outputs the chirp navigation signal for embedding in the communication signal by way of diplexer 35. Diplexer 35 modifies the communication signal output from the base transceiver section 23 by embedding the chirp navigation signal within the communication signal. The diplexer outputs the composite signal to the transmitter RF chain 36 for transmission using antenna 37.

Figure 15B:
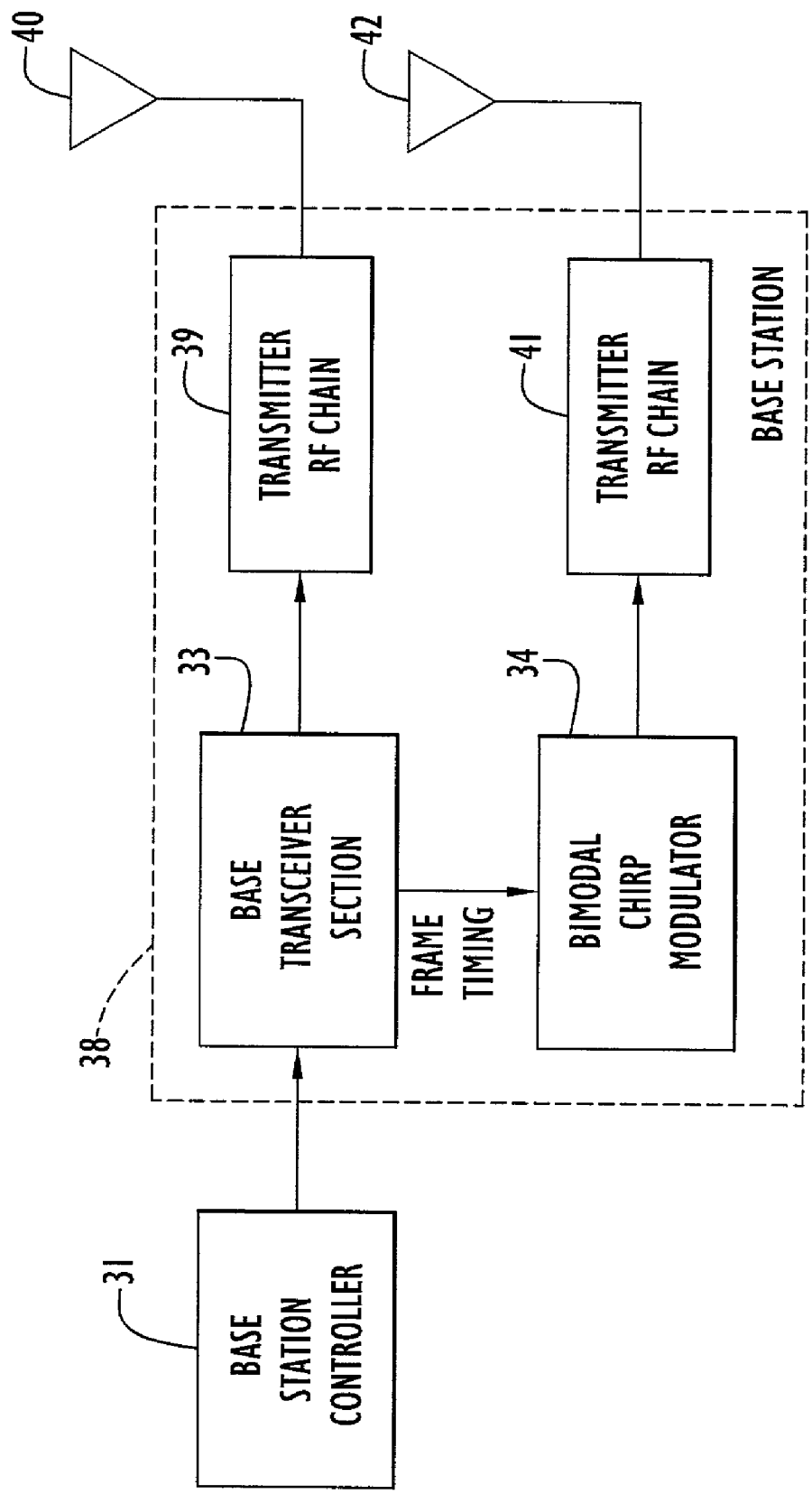
FIG. 15B is a block diagram of the base station transceiver section in which the navigation and GSM communication signals are transmitted through separate antennas.

In another embodiment of a base station suitable for use in a GSM network, shown in FIG. 15B, the navigation signal is transmitted through a separate antenna. In FIG. 15B the base station controller 31 outputs the communication signal to the second signal generator 38. The second signal generator 38 includes base transceiver section 33 providing frame timing information to bimodal chirp modulator 34, and also outputting the communication signal to a transmitter RF chain 39 coupled to a first antenna 40. Bimodal chirp modulator 34 outputs the navigation chirp signal to a second transmitter RF chain 41 for transmission with the communication signal but broadcast by a separate antenna 42.

Figure 16:
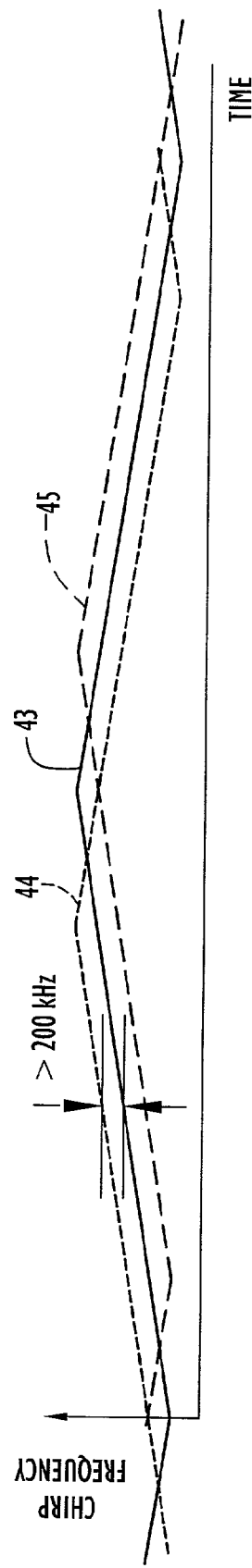
FIG. 16 illustrates the time offset of the chirp signals transmitted by three different base stations.

FIG. 16 illustrates the time offset of chirp signals transmitted by three different base stations. Chirp signals from a first of the three base stations is shown by solid line 43. The navigation chirp signal from a second base station is shown by dashed line 44 offset by +200 KHz from the first base station navigation signal. A navigation chirp signal from a third base station is shown by dashed line 45, in which the chirp signal is offset by −200 kHz from the navigation signal of the first base station. The offsets of signals from the other base stations are such that no two instantaneous chirp frequencies are closer than the bandwidth of one channel, e.g., 200 kHz, during time intervals when the two chirps have the same sense, i.e., up-chirp or down-chirp.

Reception and appropriate processing of the embedded chirp navigation signal at a mobile station required to make the measurements from which a position solution is derived can be implemented in new or legacy mobile units via software-only, hardware-only or hybrid modules. No external timing source, e.g. GPS, is required to be employed at base stations or at mobile units.

Figure 17:
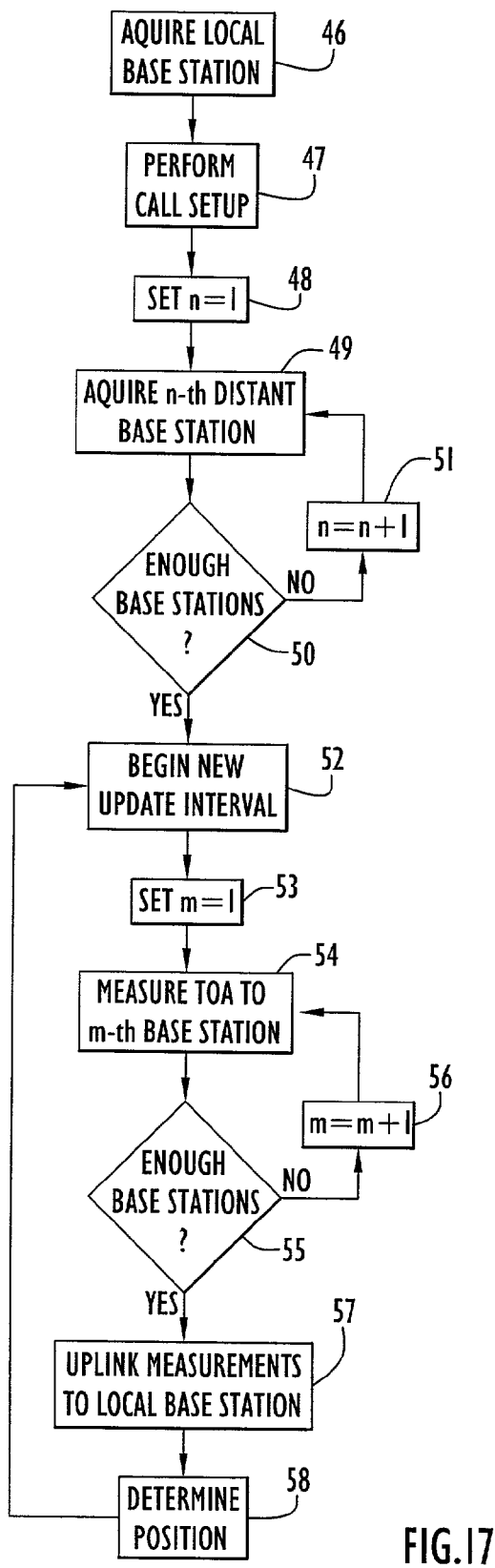
FIG. 17 is a flow chart illustrating the operation of a communication system employing an embedded chirp signal for use in position determination.

FIG. 17 summarizes the position determination process using a chirp signal embedded in a wireless communication system. This process involves a mobile unit entering the network using the GSM communication signals in a conventional manner to receive and process frequency and synchronization bursts. When these conventional procedures are successfully completed, the mobile unit is synchronized with the received frame structure, and hence, with the navigation signal. The mobile terminal then can initiate conventional communication procedures and reception of the navigation signal according to the method illustrated in FIG. 17 and described below.

A mobile unit receiver, such as the receiver shown in either FIG. 7 or 11, acquires the communication signal with the embedded navigation signal broadcast by a local base station in operation 46. The mobile unit then performs a call set up procedure 47 and sets a counter n equal to 1 in operation 48. The mobile terminal then, in operation 49, acquires another distant base station, namely the base station corresponding to the variable n. The mobile unit determines in operation 50 if it has acquired enough base stations to perform a navigation solution. If not, the variable n is incremented by 1 in operation 51 and additional base stations are acquired. If enough base stations have been acquired then the mobile unit begins a new update interval in operation 52. Here, another variable m is set equal to 1 in operation 53 and the mobile unit measures the time of arrival (TOA) to the m-th base station in operation 54. The mobile unit then determines in operation 55 if the TOA has been measured to enough base stations to perform the position solution, and if not, the variable m is incremented by 1 in operation 56. If the TOA has been measured to enough base stations then in operation 57 the mobile terminal uplinks the TOA, or pseudorange measurements to a local base station. The local base station determines the mobile unit's position, or alternatively, a central navigation processing site in communication with the local base station determines the mobile unit's position in operation 58. The processing flow returns back to operation 52 and the mobile unit begins a new update interval to continue determining and measuring TOAs to various base stations in order to further update its position.

The following sections describe the performance characteristics of a chirp navigation signal embedded in a communication signal.

Chirp Ranging Accuracy in Noise Alone

A standard measure of the 1-σ arrival time accuracy possible from reception of a specific pulse shape in white noise is given by the Cramer-Rao (C-R) bound $$\sigma_\tau = \frac{1}{\beta\sqrt{2E/N_0}}, \tag{1}$$

in which $E/N_o$ is the pulse signal-to-noise ratio (SNR) and $\beta$ is the mean-squared bandwidth of the pulse. The C-R bound represents the minimum achievable error, and is an accurate estimate as long as the SNR exceeds a threshold. When the pulse is a chirp waveform having average power P, duration T and sweep W, the C-R bound is $$\sigma_\tau = \frac{\sqrt{3}/\pi}{W\sqrt{2PT/N_0}} = \frac{0.55}{W\sqrt{2E/N_0}}. \tag{2}$$

To evaluate the C-R bound the chirp SNR is estimated. This assumes that a GSM user at the cell edge receives a bit SNR of $E_b/N_o$=8 dB. With the chirp power set 20 dB below the communications power, the SNR in a chirp lasting one bit time would be $E/N_o$=−12 dB. A three-slot duration chirp contains 3×156=468 bit times (26.70 dB-bits), driving the total SNR to $E/N_o$=14.70 dB. After the blanking discount (1.25 dB), the achieved result is $E/N_o$=13.45 dB. When this is introduced into equation (2), with the bandwidth set to W=1.75 MHz, the single-measurement pseudorange error is 13.22 m (1-σ). Averaging 27 pseudoranges over 1 second reduces the error by a factor of $\sqrt{27}$ (=5.2) to 2.5 m.

In the absence of other effects, this calculation might suggest that the chirp signal has been over-designed, and its accuracy could be relaxed by decreasing either its power or bandwidth. There are, however, several other considerations.

Figure 18:
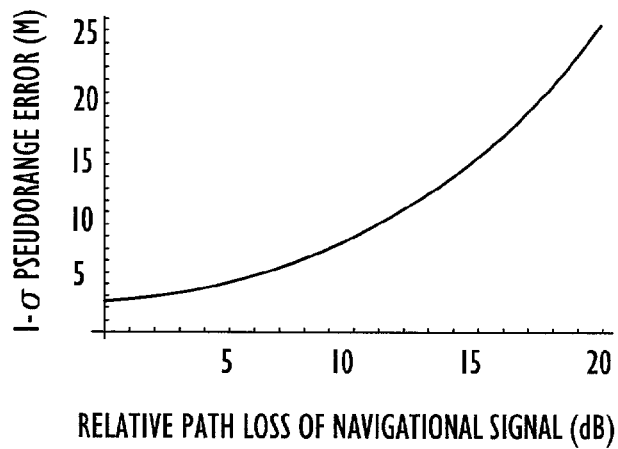
FIG. 18 is a graph illustrating per-second pseudorange error vs. relative propagation loss of a distant chirp.

A chirp coming from a more distant base station may be weaker than the one transmitted by the local station. In what seems like a worst case, another participating base station could be three times as distant as the local one. Under propagation conditions associated with cluttered environments, where signal power may decline in proportion to the $4^{th}$ power of range, this is a loss of 19 dB. FIG. 18 shows the per-second pseudorange error as a function of the relative propagation loss of the distant chirp, assuming that the local base station communications is blanked and there is no other interference. Observe that if the distant chirp is no more than 10 dB down, the error does not exceed 8 m.

The next section describes at interference issues in greater detail. Other processing techniques are described to deal with both local and distant base station communications traffic, and it becomes evident that blanking may not always be the preferable solution.

Chirp Ranging Accuracy in Both Noise and Interference

The above analysis for determining chirp ranging accuracy in a noise only environment accounts for mutual interference. The embedded navigation signal should cause no significant disruption to communications, nor should the ranging fail due to communication signals present in the chirp bands. These effects are quantified next.

Use of the chirp navigation signals described here virtually eliminates chirp-on-chirp mutual interference by time staggering the chirps at the base stations; it would do so trivially if all chirps were unidirectional. Because alternating sign, or bimodal, chirps are used to ameliorate Doppler effects, there will be times when an up-chirp and a down-chirp cross, but the filter matched to one of those chirps will substantially reject the other so that there is no significant interference. In some cases, subbands containing a crossing will be blanked by the receiver because of the LO settling time, and the point becomes moot.

Effects due to communication signals emanating from the local base station, for which the power relationship is fixed independent of range, largely can be eliminated through blanking, as described earlier. However, the position determination function cannot afford to routinely blank communication signals from more distant base stations, even if they are fairly strong, since the resulting signal power loss becomes intolerable. In fact, the following treatment also applies to locally generated signals as well.

A better way to process the received signal is to treat the input as though the noise power density were time varying in a predictable fashion and use weighting rather than on-off processing to combine the various portions. Given that the mobile set maintains signal strength measurements for all base stations, the chirp segments may be coherently combined with weighting factors derived from a maximum likelihood estimation criterion to optimize the resulting pseudorange. That is, as base stations with different signals strengths sequentially interfere with a given chirp, the fluctuating effective noise floor values may be taken into account in the range estimate.

The mean noise-equivalent power spectral density of a base station communications signal is estimated by discounting the signal peak power for its duty factor and relative path loss, and dividing by the observable chirp bandwidth, thus modeling it as band-limited white noise.

The received bit SNR can be written in terms of the power, P, and bit time, $T_b$, as $$\frac{E_b}{N_0} = \frac{PT_b}{N_0}. \tag{3}$$

The equivalent noise power density is the ratio $\alpha\delta P/W_c$, where $W_c$ is the observable chirp bandwidth ($\approx\gamma/T_b$, where $\gamma$ is the bandwidth expansion, i.e. the ratio of the observable chirp bandwidth to the communication signal bandwidth), $\alpha$ is the relative path loss compared to the local base station, and $\delta$ is the duty factor, i.e. the fraction of time the signal is present. The effective noise contribution of the communications signals can be written in units of the ambient noise density as $$\alpha\delta\left(\frac{P}{W_c}\right) \approx \frac{\alpha\delta P T_b}{\gamma} = \frac{\alpha\delta}{\gamma}E_b = \frac{\alpha\delta}{\gamma}\left(\frac{E_b}{N_0}\right)N_0, \quad (4)$$

and the total noise density, instead of $N_o$, increases to $N_o'$:

$$N_0' = \left[1 + \frac{\alpha\delta}{\gamma}\left(\frac{E_b}{N_0}\right)\right]N_0. \quad (5)$$

The case of local base station effects can be modeled using only equation (5). Setting $\alpha=1$, $\delta=0.25$ and $\gamma=1.75$ MHz/0.2 MHz=8.75 yields an increase of 0.68 dB, a lesser penalty than that assessed by blanking.

Figure 19:
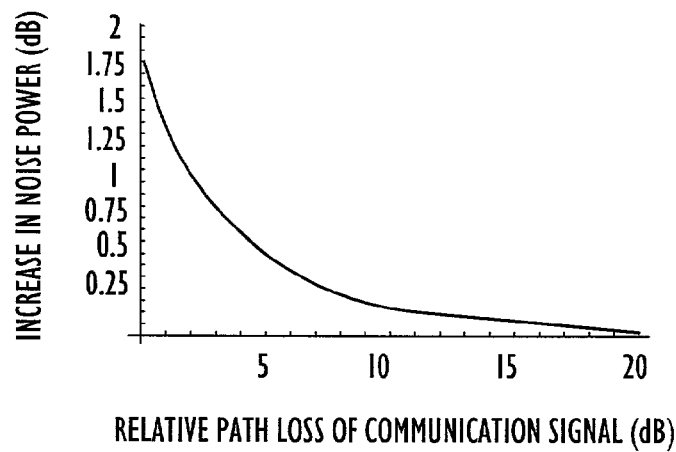
FIG. 19 is a graph illustrating an increase in effective noise power due to use of three distant base stations, with a signal from the local station blanked.

FIG. 19 shows an exemplary result computed from equation (5); it illustrates the increase in noise-equivalent power due to three distant signals vs. relative path loss in dB, for a case where the local signal is blanked and distant ones are equi-powerful. The parameters are $\delta=0.75$ (three stations, each on 25% of the time) and $\beta=1.75$ MHz/0.2 MHz=8.75 (observable chirp bandwidth-to-communications bandwidth ratio). If the average excess path loss is 3 dB or more, the noise floor increase is less than 1 dB, equivalent to a 13% increase in range error.

Figure 20:
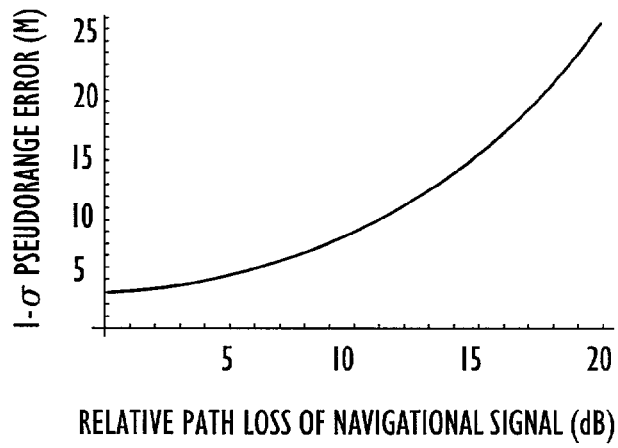
FIG. 20 is a graph illustrating per-second pseudorange error vs. relative propagation loss of a distant chirp, including an increase in effective noise power due to three distant base stations, with a signal from the local station blanked.

A more troublesome scenario is the reception of a distant chirp. The results for the noise-only model have already been shown in FIG. 18. When the chirp crosses a communication band from the local station the receiver can be blanked, but when it competes with other distant base station communications it cannot. It is impractical to assert that any particular signal strength model dominates this scenario, but a reasonable approximation is to assume the local signals are blanked and the distant communication signals from all base stations are equal in strength. Then, the above noise enhancement analysis applies, along with the drop in desired signal strength vs. increasing path length. When these effects are combined, they lead to the ranging performance shown in FIG. 20. When compared to FIG. 18, this graph shows small increases for low differential path losses, but no impact at greater ones. Hence, the worst cases are noise-limited, not interference limited.

Multipath Mitigation

The methods described above are designed for a multipath-free environment. Since almost all GSM scenarios include multipath propagation, position determination must also work well in its presence. Techniques to cope with multipath on communication signals are already incorporated into a conventional GSM receiver; these include channel estimation, equalization and maximum likelihood symbol sequence estimation.

As is evident in FIG. 13B, the range resolution capability of a chirp is comparable to that of a PN code whose chip rate equals the total frequency sweep of the chirp. Therefore components more distant than 170 m are resolvable. For a pedestrian or vehicular mobile station, the multipath environment will remain roughly constant over a frame of eight time slots (4.6 ms). Due to closer-in reflections the observed multipath signal can be a superposition of many path components, causing it to exhibit amplitude fading. As a result, some signals will not be suitable for sufficiently accurate range measurement some of the time. For this reason the mobile station should observe as many base stations as possible for the purpose of providing high-quality inputs to the position algorithm whenever it can. Availability of multiple base station signals also decreases the geometric dilution of precision in converting a set of pseudoranges to a position estimate. Making an occasional change to the set of base stations participating in the position determination algorithm is a form of selection diversity. Alternatively, vector tracking technology, such as described in U.S. Pat. No. 5,398,034, incorporated by reference herein, can be employed to optimally combine the various measurements, providing the theoretically optimum solution and potentially relieving the mobile station from decision responsibility in this regard.

Estimate of Achievable Position Accuracy

It is expected that conventional implementations of DTOA techniques are not likely to meet current regulatory requirements of 50 m positional accuracy. If the geometric dilution of position (GDOP) for a 2-D position is assumed to be about 1.5, the individual measurement accuracies must be around 33 m or less to meet the regulatory requirements. Chirp range accuracies are estimated above to be at most 25 m if the distant signals are as much as 20 dB down and accuracy from the local chirp is under 5 m. Then if the average measurement accuracy is taken to be around 20 m, overall position accuracy of some 30 m is expected. This estimate can tolerate another factor of 1.6 dilution for unmodeled effects such as multipath and poor base station geometry without exceeding the target of 50 m.

Judicious coupling of the DTOA data into the overall algorithm, however, can further decrease the error. A receiver equipped to make the chirp navigation measurements is also able to make the training sequence DTOA measurements on the existing communication signals. Given any set of facts describing the physical circumstances-locations of base stations and receivers, transmitted power levels for the communications and navigation signals, details of the signal structures, signal propagation conditions, receiver processing algorithms, etc—it is possible to use well-established engineering procedures to estimate the relative accuracy of position measurements made respectively by the chirp and training-sequence-based methods. For the preferred embodiment described herein it is estimated that errors in the chirp-based position estimates are in the range of 25% to 65% of the errors for the training-sequence-based methods.

Comparable estimates can be made in operational scenarios using information available at the receiver and network locations. Knowing the results of such estimates, it becomes possible to derive relative weights to be used in combining the various measurements into a unified and more accurate estimate. In addition to simple linear combination of estimates, various outlier, or integrity tests can be performed to exclude anomalous measurements from the data set used to compute the final result.

Having described preferred embodiments of apparatuses and methods for embedding a chirp signal in a cellular communication signal, it is believed that other modifications, variations and changes will be suggested to those skilled in the art in view of the teachings set forth herein. It is therefore to be understood that all such variations, modifications and changes are believed to fall within the scope of the present. Although specific terms are employed herein, they are used in their ordinary and accustomed manner only, unless expressly defined differently herein, and not for purposes of limitation.

What is claimed is:

1. A mobile unit receiver suitable for use in a wireless communication network, comprising:
a receiving section configured to receive from a transmitting station a wireless communication signal having a plurality of frames and a spread spectrum chirp navigation signal embedded in the communication signal in synchronization with said frames;
a synthesizer unit configured to generate a frequency signal;
a mixer having a first input port coupled to the receiving section, a second input port coupled to the synthesizer unit, and an output port outputting a wireless communication signal downconverted based on the frequency signal; and
a signal processor unit coupled to the mixer and configured to receive the downconverted signal output from the mixer, wherein the signal processor unit is configured to detect the embedded spread spectrum chirp navigation signal and to correlate it with a reference chirp signal to output a pseudorange measurement signal based on the correlation;
wherein the synthesizer unit is coupled to the signal processor unit and is configured to adjust the frequency signal based on the pseudorange measurement signal.

2. The mobile unit receiver of claim 1, wherein the signal processor unit comprises:
a chirp generator configured to generate the reference chirp signal based on timing of the frames in the communication signal;
a correlator connected to the chirp generator and configured to correlate the reference chirp signal with the spread spectrum chirp navigation signal embedded in the wireless communication signal and output a correlation signal; and
an arrival time estimator configured to output a pseudorange value based on the correlation signal.

3. The mobile unit receiver of claim 2, further comprising a filter connected to the output port of the mixer and the signal processor unit, and configured to filter the downconverted signal based on a frequency band corresponding to a plurality of the frames of the communication signal.

4. The mobile unit receiver of claim 2, further comprising a filter connected to the output port of the mixer and the signal processor unit, and configured to filter the downconverted signal based on a frequency band corresponding to a single frame of the communication signal.

5. A mobile unit receiver suitable for use in a wireless communication network, comprising:
receiving means for receiving from a transmitting station a wireless communication signal having a communication signal with a plurality of frames and a spread spectrum chirp navigation signal embedded in the communication signal in synchronization with said frames;
synthesizer means for generating a frequency signal;
downconverting means for downconverting a frequency of a wireless communication signal based on with a frequency signal; and
processing means for detecting the embedded navigation signal in the downconverted wireless communication signal and determining a pseudorange measurement based on the detected embedded navigation signal, wherein the processing means comprises:

chirp generator means for generating a reference chirp signal based on timing of the frames in the communication signal;
correlator means for correlating the reference chirp signal with the downconverted wireless communication signal and outputting a correlation signal; and
means for estimating an arrival time of the communication signal based on the correlation signal by correlating the wireless communication with said reference chirp signal and outputting a pseudorange value based on the correlation signal;
wherein said synthesizer means adjusts the frequency signal based on the pseudorange value.

6. A method of determining a location of a mobile unit in a communication system, the method comprising:
extracting a chirp spread spectrum signal from a communication signal that includes a frame having a plurality of slots broadcast from a transmitter, wherein the chirp spread spectrum signal is embedded within the frame and synchronized with a frame structure of the communication signal, said extracting comprises extracting the chirp spread spectrum signal only during slots that are not used for transmission or reception of the communication signal;
determining a pseudorange measurement between the mobile unit and the transmitter based on the extracted chirp spread spectrum signals; and
determining a location of the mobile unit based on the pseudorange measurement.

7. The method of claim 6, wherein extracting comprises correlating the received chirp spread spectrum signal with a local reference chirp spread spectrum signal over an observation period corresponding to a plurality of time slots, and wherein the time base of the local reference chirp spread spectrum signal is derived from the communication signal without reference to an external timing source.

8. The method of claim 7, wherein correlating comprises correlating on an individual time slot basis using a weighting coefficient for each time slot.

9. The method of claim 8, and further comprising determining said weighting coefficients based on measurements of noise and interference levels received during the time slots to maximize a signal-to-noise-plus-interference ratio of an accumulated correlation output.

10. The method of claim 6, further comprising determining at the mobile unit a position of the mobile unit based on the pseudorange measurement and other range measurements.

11. The method of claim 6, further comprising transmitting the pseudorange measurement to a location processing center for determining the position of the mobile unit.

12. A method of determining a position of a mobile unit in a communication system, comprising:
(a) extracting from a received communication signal a spread spectrum chirp signal that includes a first chirp portion of a first sense and a second chirp portion of a second sense that is opposite to the first sense, wherein said extracting comprises extracting the chirp spread spectrum signal only during time slots that are not used for transmission or reception by the mobile unit;
(b) determining a pseudorange measurement between the mobile unit and a transmitter that transmits the communication signal based on the spread spectrum chirp signal; and
(c) determining a position of the mobile unit based on the pseudorange measurement.

13. The method of claim 12, wherein (a) extracting and (b) determining are performed for multiple instances of the spread spectrum chirp signal, and further comprising averaging pseudorange measurements taken from said multiple instances.

14. The method of claim 13, and further comprising accumulating averages from pairs of instances of the spread spectrum chirp signal to remove noise and interference.

15. The method of claim 12, wherein (a) extracting and (b) determining are performed with respect to a communication signal received from each of a plurality of transmitters to produce a plurality of pseudorange measurements, and wherein (c) determining comprises computing the position of the mobile unit based on the plurality of pseudorange measurements.

* * * * *